US009276945B2

(12) United States Patent
Lietz et al.

(10) Patent No.: US 9,276,945 B2
(45) Date of Patent: Mar. 1, 2016

(54) METHOD AND SYSTEM FOR PROVIDING SECURITY AWARE APPLICATIONS

(71) Applicant: Intuit Inc., Mountain View, CA (US)

(72) Inventors: M. Shannon Lietz, San Marcos, CA (US); Luis Felipe Cabrera, Bellevue, WA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 14/247,131

(22) Filed: Apr. 7, 2014

(65) Prior Publication Data

US 2015/0288708 A1 Oct. 8, 2015

(51) Int. Cl.
G06F 21/00 (2013.01)
H04L 29/06 (2006.01)

(52) U.S. Cl.
CPC .................. H04L 63/1408 (2013.01)

(58) Field of Classification Search
CPC .............. H04L 63/1416; H04L 63/145; H04L 63/1441; G06F 21/566; G06F 21/56
See application file for complete search history.

(56) References Cited

U.S. PATENT DOCUMENTS

| 5,731,991 | A | 3/1998 | Kinra et al. |
|---|---|---|---|
| 6,085,224 | A * | 7/2000 | Wagner .............. H04L 29/06 709/203 |
| 6,205,552 | B1 * | 3/2001 | Fudge .............. H04L 63/1425 726/25 |
| 6,343,236 | B1 | 1/2002 | Gibson et al. |
| 6,651,183 | B1 | 11/2003 | Gensler et al. |
| 7,114,183 | B1 | 9/2006 | Joiner |
| 7,296,261 | B2 | 11/2007 | Witchel et al. |
| 7,506,371 | B1 | 3/2009 | Ben-Natan |
| 7,552,424 | B1 | 6/2009 | Bischof et al. |
| 7,640,458 | B2 | 12/2009 | Rao et al. |
| 7,788,235 | B1 | 8/2010 | Yeo |
| 7,792,256 | B1 | 9/2010 | Arledge et al. |
| 7,944,355 | B2 | 5/2011 | Kumar et al. |
| 7,996,836 | B1 | 8/2011 | McCorkendale et al. |

(Continued)

FOREIGN PATENT DOCUMENTS

| WO | WO 02/091182 | 11/2002 |
|---|---|---|
| WO | WO 2013/067404 | 5/2013 |
| WO | WO 2015/102776 | 7/2015 |

OTHER PUBLICATIONS

Lietz et al., "Method and System for Dynamic and Comprehensive Vulnerability Management," U.S. Appl. No. 14/052,971, filed Oct. 14, 2013.

(Continued)

*Primary Examiner* — Yonas Bayou
(74) *Attorney, Agent, or Firm* — Hawley Troxell Ennis & Hawley LLP; Philip McKay

(57) ABSTRACT

Instructions for monitoring and detecting one or more trigger events in assets used to implement an application are generated. Instructions for implementing at least one responsive action associated with each of the one or more trigger events is generated. At least part of instructions for monitoring and detecting the one or more trigger events is provided to an asset used to implement the application. The at least part of the instructions for monitoring and detecting the one or more trigger events are used by the asset to detect a trigger event. The instructions for implementing the at least one responsive action associated with each of the one or more trigger events is then used to automatically implement the at least one responsive action associated with the detected trigger event.

46 Claims, 4 Drawing Sheets

(56) References Cited

U.S. PATENT DOCUMENTS

| | | | |
|---|---|---|---|
| 8,171,554 B2 | 5/2012 | Elovici et al. | |
| 8,181,036 B1 | 5/2012 | Nachenberg | |
| 8,281,399 B1* | 10/2012 | Chen | G06F 21/564 726/24 |
| 8,510,821 B1 | 8/2013 | Brandwine et al. | |
| 8,555,388 B1* | 10/2013 | Wang | H04L 63/1416 709/245 |
| 8,561,126 B2 | 10/2013 | Ananthanarayanan et al. | |
| 8,561,127 B1 | 10/2013 | Agrawal et al. | |
| 8,615,785 B2 | 12/2013 | Elrod et al. | |
| 9,049,105 B1 | 6/2015 | Feinstein et al. | |
| 2002/0099992 A1 | 7/2002 | Distler et al. | |
| 2002/0116404 A1 | 8/2002 | Cha et al. | |
| 2003/0051154 A1 | 3/2003 | Barton et al. | |
| 2003/0084327 A1 | 5/2003 | Lingafelt et al. | |
| 2003/0195959 A1 | 10/2003 | Labadie et al. | |
| 2004/0237093 A1 | 11/2004 | Sluiman et al. | |
| 2005/0066309 A1 | 3/2005 | Creamer et al. | |
| 2005/0091304 A1* | 4/2005 | Trayler | H04L 12/24 709/200 |
| 2005/0172162 A1 | 8/2005 | Takahashi et al. | |
| 2005/0193269 A1 | 9/2005 | Haswell et al. | |
| 2005/0204151 A1 | 9/2005 | Fang et al. | |
| 2005/0278790 A1* | 12/2005 | Birk | G06F 21/54 726/26 |
| 2006/0101520 A1* | 5/2006 | Schumaker | G06F 21/554 726/25 |
| 2006/0293940 A1 | 12/2006 | Tsyganskiy et al. | |
| 2007/0027999 A1 | 2/2007 | Allen et al. | |
| 2007/0079168 A1 | 4/2007 | Sivakumar et al. | |
| 2007/0094711 A1 | 4/2007 | Corley et al. | |
| 2007/0180509 A1 | 8/2007 | Swartz et al. | |
| 2007/0250424 A1 | 10/2007 | Kothari | |
| 2008/0016570 A1 | 1/2008 | Capalik | |
| 2008/0025288 A1 | 1/2008 | Benner et al. | |
| 2008/0044018 A1 | 2/2008 | Scrimsher et al. | |
| 2008/0262990 A1 | 10/2008 | Kapoor et al. | |
| 2008/0263670 A1 | 10/2008 | Stavrica | |
| 2008/0295076 A1 | 11/2008 | McKain et al. | |
| 2009/0007264 A1 | 1/2009 | Chatterjee et al. | |
| 2009/0089682 A1 | 4/2009 | Baier et al. | |
| 2009/0106838 A1 | 4/2009 | Clark et al. | |
| 2009/0199273 A1 | 8/2009 | Yalamanchi | |
| 2009/0254990 A1 | 10/2009 | McGee | |
| 2009/0288078 A1 | 11/2009 | Makonahalli et al. | |
| 2009/0300045 A1 | 12/2009 | Chaudhry et al. | |
| 2009/0300423 A1 | 12/2009 | Ferris | |
| 2009/0319527 A1 | 12/2009 | King et al. | |
| 2010/0077203 A1 | 3/2010 | Ogawa et al. | |
| 2010/0122317 A1 | 5/2010 | Yadav | |
| 2010/0251363 A1 | 9/2010 | Todorovic | |
| 2010/0269121 A1 | 10/2010 | Montesissa et al. | |
| 2010/0318481 A1 | 12/2010 | Feynman | |
| 2011/0034182 A1 | 2/2011 | Issa et al. | |
| 2011/0047621 A1* | 2/2011 | Brando | G06F 8/61 726/24 |
| 2011/0055921 A1* | 3/2011 | Narayanaswamy | H04L 63/1458 726/22 |
| 2011/0138469 A1* | 6/2011 | Ye | G06F 21/577 726/25 |
| 2011/0145657 A1 | 6/2011 | Bishop et al. | |
| 2011/0208677 A1 | 8/2011 | Zhou et al. | |
| 2011/0238855 A1 | 9/2011 | Korsunsky et al. | |
| 2012/0005750 A1* | 1/2012 | Satish | G06F 21/52 726/23 |
| 2012/0039336 A1 | 2/2012 | Richmond et al. | |
| 2012/0072985 A1 | 3/2012 | Davne et al. | |
| 2012/0151488 A1 | 6/2012 | Arcese et al. | |
| 2012/0185390 A1 | 7/2012 | Palnitkar et al. | |
| 2012/0185913 A1 | 7/2012 | Martinez et al. | |
| 2012/0209947 A1 | 8/2012 | Glaser et al. | |
| 2012/0210437 A1 | 8/2012 | Karande et al. | |
| 2012/0233668 A1 | 9/2012 | Leafe et al. | |
| 2012/0303776 A1 | 11/2012 | Ferris | |
| 2012/0304300 A1 | 11/2012 | Labumbard | |
| 2012/0311157 A1 | 12/2012 | Erickson et al. | |
| 2012/0324576 A1 | 12/2012 | Clark et al. | |
| 2013/0019242 A1 | 1/2013 | Chen et al. | |
| 2013/0046667 A1 | 2/2013 | Hill et al. | |
| 2013/0054792 A1 | 2/2013 | Sharaf | |
| 2013/0055398 A1 | 2/2013 | Li et al. | |
| 2013/0067067 A1 | 3/2013 | Miri et al. | |
| 2013/0091376 A1 | 4/2013 | Raspudic et al. | |
| 2013/0117809 A1* | 5/2013 | McDougal | H04L 63/1408 726/1 |
| 2013/0117852 A1* | 5/2013 | Stute | H04L 63/1425 726/23 |
| 2013/0160072 A1 | 6/2013 | Reus et al. | |
| 2013/0247135 A1 | 9/2013 | Kundu et al. | |
| 2013/0291087 A1 | 10/2013 | Kailash et al. | |
| 2013/0305357 A1 | 11/2013 | Ayyagari et al. | |
| 2013/0339514 A1 | 12/2013 | CRANK et al. | |
| 2013/0347131 A1 | 12/2013 | Mooring et al. | |
| 2014/0013452 A1 | 1/2014 | Aissi et al. | |
| 2014/0026122 A1 | 1/2014 | Markande et al. | |
| 2014/0026179 A1 | 1/2014 | Devarajan et al. | |
| 2014/0068784 A1 | 3/2014 | Merkow et al. | |
| 2014/0082621 A1 | 3/2014 | Fitzgerald et al. | |
| 2014/0258446 A1 | 9/2014 | Bursell | |
| 2014/0258715 A1 | 9/2014 | Rodniansky | |
| 2014/0282840 A1 | 9/2014 | Guinan | |
| 2014/0317737 A1 | 10/2014 | Shin et al. | |
| 2014/0344933 A1 | 11/2014 | Huh et al. | |
| 2015/0052108 A1 | 2/2015 | Volk et al. | |
| 2015/0052402 A1 | 2/2015 | Gurumurthy et al. | |

OTHER PUBLICATIONS

Lietz et al., "Method and System for Creating and Dynamically Deploying Resource Specific Discovery Agents for Determining the State of a Cloud Computing Environment," U.S. Appl. No. 14/079,425, filed Nov. 13, 2013.

Lietz et al., "Method and System for Creating Enriched Log Data," U.S. Appl. No. 14/139,449, filed Dec. 23, 2013.

Cabrera et al., "Method and System for Intrusion and Extrusion Detection," U.S. Appl. No. 14/143,999, filed Dec. 30, 2013.

Cabrera et al., "Method and System for Extrusion and Intrusion Detection in a Cloud Computing Environment Using Network Communications Devices," U.S. Appl. No. 14/166,116, filed Jan. 28, 2014.

Cabrera et al., "Method and System for Extrusion and Intrusion Detection in a Cloud Computing Environment," U.S. Appl. No. 14/171,388, filed Feb. 3, 2014.

Lietz et al., "Method and System for Virtual Asset Assisted Extrusion and Intrusion Detection in a Cloud Computing Environment," U.S. Appl. No. 14/171,438, filed Feb. 3, 2014.

Bishop et al., "Method and System for Testing Cloud Based Applications in a Production Environment Using Fabricated User Data," U.S. Appl. No. 14/222,279, filed Mar. 21, 2014.

Weaver et al., "Method and System for Comparing Different Versions of a Cloud Based Application in a Production Environment Using Segregated Backend Systems," U.S. Appl. No. 14/231,141, filed Mar. 31, 2014.

Brinkley et al., "Method and System for Testing Cloud Based Applications and Services in a Production Environment Using Segregated Backend Systems," U.S. Appl. No. 14/231,253, filed Mar. 31, 2014.

Cabrera et al., Method and System for Providing Self-Monitoring, Self-Reporting, and Self-Repairing Virtual Assets in a Cloud Computing Environment, U.S. Appl. No. 14/256,289, filed Apr. 18, 2014.

Bishop et al., "Method and System for Ensuring an Application Conforms with Security and Regulatory Controls Prior to Deployment," U.S. Appl. No. 14/261,621, filed Apr. 25, 2014.

Lietz et al., "Method and System for Detecting Irregularities and Vulnerabilities in Dedicated Hosting Environments," U.S. Appl. No. 14/266,018, filed Apr. 30, 2014.

(56) References Cited

OTHER PUBLICATIONS

Lietz et al., "Method and System for Providing Reference Architecture Pattern-Based Permissions Management," U.S. Appl. 14/266,107, filed Apr. 30, 2014.

Cabrera et al., "Method and Apparatus for Automating the Building of Threat Models for the Public Cloud," U.S. Appl. No. 14/288,260, filed May 27, 2014.

Bonney et al., "Method and System for Implementing Data Security Policies Using Database Classification," U.S. Appl. No. 14/289,817, filed May 29, 2014.

Lietz et al., "Method and System for Secure Delivery of Information to Computing Environments," U.S. Appl. No. 14/319,286, filed Jun. 30, 2014.

Cabrera et al., "Method and System for Efficient Management of Security Threats in a Distributed Computing Environment," U.S. Appl. No. 14/319,352, filed Jun. 30, 2014.

Lietz et al., "Method and System for Providing a Virtual Asset Perimeter," U.S. Appl. No. 14/448,281, filed Jul. 31, 2014.

Cabrera et al., "Method and System for Providing Automated Self-Healing Virtual Assets," U.S. Appl. No. 14/448,326, filed Jul. 31, 2014.

* cited by examiner

METHOD AND SYSTEM FOR PROVIDING SECURITY AWARE APPLICATIONS

BACKGROUND

As various forms of distributed computing, such as cloud computing, have come to dominate the computing landscape, security has become a bottleneck issue that currently prevents the complete migration of various capabilities and systems associated with sensitive data, such as financial data, to cloud-based infrastructures, and/or other distributive computing models. This is because many owners and operators of data centers that provide access to data and other resources are extremely hesitant to allow their data and resources to be accessed, processed, and/or otherwise used, by virtual assets in the cloud.

In a cloud computing environment, various assets, such as, but not limited to, virtual machine instances, data stores, communications systems, and various services, are created, launched, or instantiated, in a production environment for use by an application, i.e., an "owner" of the asset, herein also referred to as a user of the asset.

Herein the terms "owner" and "user" of an asset include, but are not limited to, applications, systems, and sub-systems of software and/or hardware, as well as persons or entities associated with an account number, or other identity, through which the asset is purchased, approved managed, used, and/or created.

One major security issue in a cloud computing environment is that vulnerabilities associated with applications, assets, and virtual assets are not always readily identifiable and/or known or understood at the time the applications and assets are created and deployed, e.g., instantiated, in a given computing environment and, once deployed, accurately identifying potential security breaches, and responding to newly identified vulnerabilities through "normal" communications channels associated with the assets can be challenging, if not impossible.

In addition, in some cases, a malicious entity is able to take control of an asset. In these cases, the malicious entity often takes over, or closes down, normal communications channels associated with the asset. Consequently, in some cases, the malicious entity can mask the fact they have taken control of the asset, and/or be left relatively free to manipulate the asset under its control and access any data used by the asset, with little or no indication, or immediate recourse, for the legitimate owner of the asset.

Given that virtual assets often process and control sensitive data, the situation described above represents a significant issue that must be resolved before highly sensitive data, such as financial data, can be safely processed in a cloud computing environment.

What is needed is a method and system for providing security aware applications that can self-monitor and self-alarm, or respond, to various security vulnerabilities and breach events.

SUMMARY

In accordance with one embodiment, a method and system for providing security aware applications includes defining one or more trigger events that when detected in an asset used to implement an application require at least one responsive action. In one embodiment, at least one responsive action to be associated with each of the one or more trigger events, and to be implemented in response to detection of each of the one or more trigger events, is defined.

In one embodiment, data representing instructions for monitoring and detecting the one or more trigger events in an asset used to implement the application is generated. In one embodiment, data representing instructions for implementing the at least one responsive action associated with each of the one or more trigger events in response to detection of the trigger event is generated. In one embodiment, at least part of the data representing instructions for monitoring and detecting the one or more trigger events in an asset is provided to at least one asset used to implement the application.

In one embodiment, the at least part of the data representing instructions for monitoring and detecting the one or more trigger events in an asset is used by the at least one asset to detect a trigger event involving the at least one asset. In one embodiment, at least part of the data representing instructions for implementing the at least one responsive action associated with each of the one or more trigger events is then used to automatically implement the at least one responsive action associated with the detected trigger event.

In accordance with one embodiment, a method and system for providing security aware applications includes defining one or more operational parameters associated with assets used to implement an application. In one embodiment, baseline values for the one or more operational parameters associated with assets used to implement the application are obtained and/or defined. In one embodiment, a trigger deviation value for each of the one or more operational parameters associated with assets used to implement the application are defined.

In one embodiment, one or more trigger events that when detected in an asset used to implement the application require at least one responsive action are defined and include the occurrence of a trigger deviation value for any of the one or more operational parameters associated with assets used to implement the application.

In one embodiment, at least one responsive action to be associated with each of the one or more trigger events is defined. In one embodiment, data representing instructions for monitoring and detecting the one or more trigger events in assets used to implement the application are generated. In one embodiment, data representing instructions for implementing the at least one responsive action associated with each of the one or more trigger events is generated. In one embodiment, at least part of the data representing instructions for monitoring and detecting the one or more trigger events is then provided to at least one asset used to implement the application.

In one embodiment, the at least part of the data representing instructions for monitoring and detecting the one or more trigger events is used by the at least one asset to detect a trigger event involving the at least one asset. In one embodiment, the data representing instructions for implementing the at least one responsive action associated with each of the one or more trigger events is then used to automatically implement the at least one responsive action associated with the detected trigger event.

Figure 1:
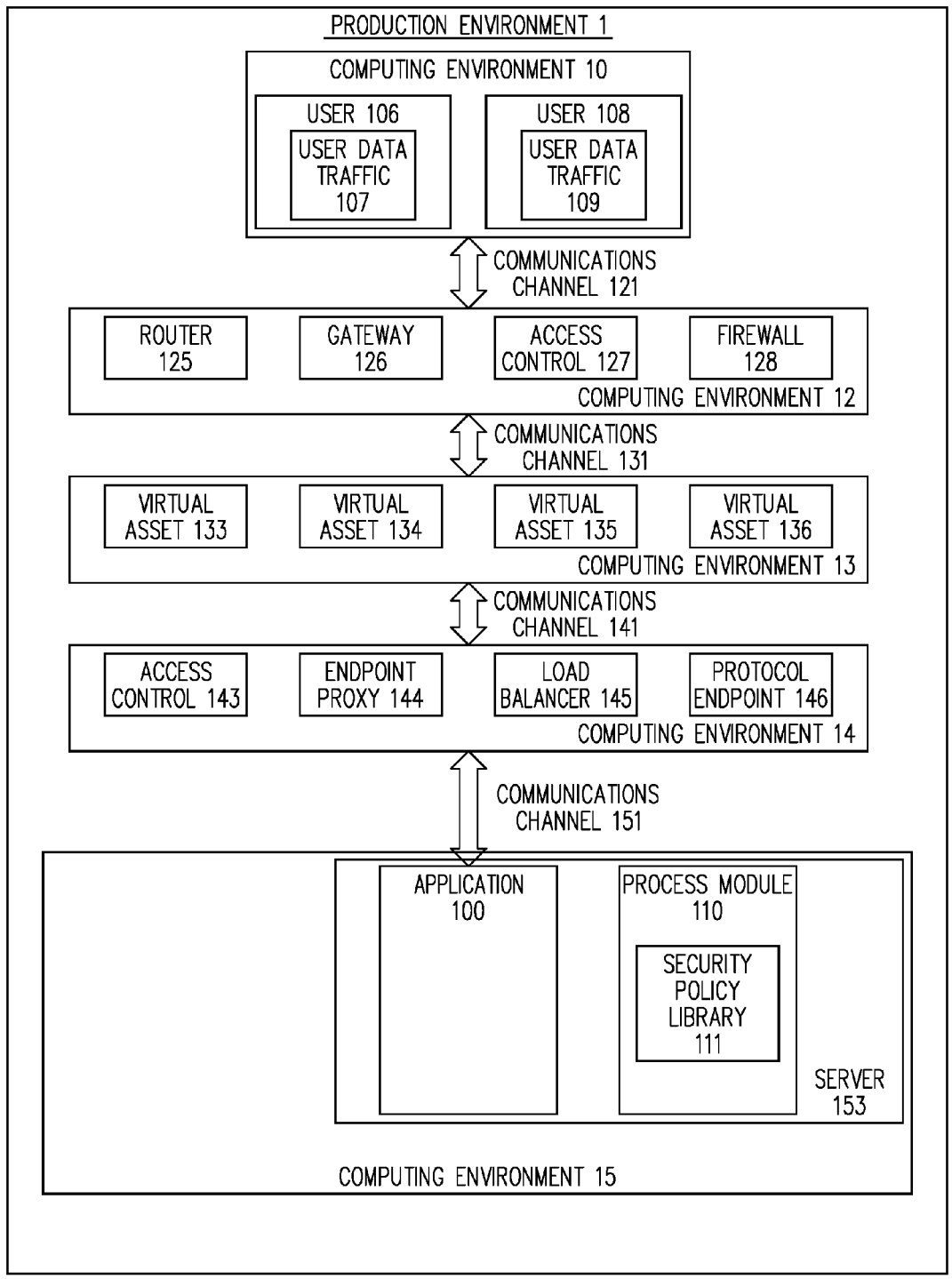
FIG. 1 is a functional block diagram showing the interaction of various elements for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a method and system for providing security aware applications includes a process for providing security aware applications implemented, at least in part, by one or more computing systems and/or computing entities in a production environment.

Herein, the term "production environment" includes the various components, or assets, used to deploy, implement, access, and use, a given application as that application is intended to be used. In various embodiments, production environments include multiple assets that are combined; communicatively coupled; virtually and/or physically connected; and/or associated with one another, to provide the production environment implementing the application.

As specific illustrative examples, the assets making up a given production environment can include, but are not limited to, one or more computing environments used to implement the application in the production environment such as a data center, a cloud computing environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, used to implement the application in the production environment; one or more communications channels used to implement the application in the production environment; one or more access control systems, such as firewalls and gateways, used to implement the application in the production environment; one or more routing systems, such as routers and switches, used to implement the application in the production environment; one or more communications endpoint proxy systems, such as load balancers or buffers, used to implement the application in the production environment; one or more traffic or access control systems used to implement the application in the production environment; one or more secure communication protocols and/or endpoints, such as Secure Sockets Layer (SSL) protocols, used to implement the application in the production environment; one or more databases used to implement the application in the production environment; one or more internal or external services used to implement the application in the production environment; one or more backend systems, such as backend servers or other hardware used to implement the application in the production environment; one or more software systems used to implement the application in the production environment; and/or any other assets/components making up an actual production environment in which an application is to be deployed, implemented, accessed, and run, as discussed herein, and/or as known in the art at the time of filing, and/or as developed after the time of filing.

As used herein, the terms "computing system" and "computing entity", include, but are not limited to, a virtual asset; a server computing system; a workstation; a desktop computing system; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "virtual asset" includes any virtualized entity or resource, and/or part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or subsystems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment, the computing systems, and/or computing entities discussed herein, and/or as known in the art at the time of filing, and/or as developed after the time of filing, can be implemented as virtual assets.

Some virtual assets are substantially similar to, or identical to, other virtual assets in that the virtual assets have the same, or similar, operational parameters such as the same, or similar, function; the same, or similar, connectivity and communication features; the same, or similar, storage capability allocated to the virtual assets; the same, or similar, processing capability allocated to the virtual assets; the same, or similar, hardware, allocated to the virtual assets; the same, or similar, software allocated to virtual assets; and/or any combination of similar, or identical, operational parameters as discussed herein, and/or as known/available in the art at the time of filing, and/or as developed/made available after the time of filing.

Typically, virtual assets are created, or instantiated, using steps, instructions, processes, code, or "recipes" referred to herein as "virtual asset creation templates." Typically, virtual assets that have the same, or similar, operational parameters are created using the same "virtual asset creation templates."

Examples of virtual asset creation templates include, but are not limited to, any tool and/or system for creating and managing a collection of related cloud resources. One specific illustrative example of such a virtual asset creation template is a cloud formation template such as any of the Amazon Web Service (AWS) cloud formation tools/templates.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or system.

Other examples of virtual asset creation templates include, but are not limited to, any virtual appliance used to instantiate virtual assets. One specific illustrative example of such a virtual asset creation template is an Amazon Machine Image (AMI).

Other examples of virtual asset creation templates include, but are not limited to, any virtual appliance, or tool, or system, or framework, used to instantiate virtual assets as discussed herein, and/or as known/available in the art at the time of filing, and/or as developed/made available after the time of filing.

Herein virtual assets that have the same, or similar, operational parameters and are created by the same virtual asset creation template are generically referred to as virtual assets of the same "class." Examples of virtual asset classes include, but are not limited to, virtual machine classes; virtual server classes; virtual database or data store classes; specific types of instances instantiated in a cloud environment; application development process classes; and application classes.

In various embodiments, the one or more assets included in the production environment and/or implementing the processes for providing security aware applications are logically or physically located, and/or associated with, two or more computing environments. As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically trusted computing environments are those where the assets, infrastructure, communication and networking systems, and security systems associated with the computing systems and/or virtual assets making up the trusted computing environment, are either under the control of, or known to, a party. In contrast, unknown, or untrusted computing environments are environments and systems where the assets, components, infrastructure, communication and networking systems, and security systems implemented and associated with the computing systems and/or virtual assets making up the untrusted computing environment, are not under the control of, and/or are not known by, a party, and/or are dynamically configured with new elements capable of being added that are unknown to the party.

Examples of trusted computing environments include the assets and components making up data centers associated with, and/or controlled by, an application and/or any computing systems and/or virtual assets, and/or networks of computing systems and/or virtual assets, associated with, known by, and/or controlled by, an application. Examples of untrusted computing environments include, but are not limited to, public networks, such as the Internet, various cloud-based computing environments, and various other forms of distributed computing systems.

It is often the case that an application needs to transfer data to, and/or from, a first computing environment that is an untrusted computing environment, such as, but not limited to, a public cloud, a virtual private cloud, and a trusted computing environment, such as, but not limited to, networks of computing systems in a data center controlled by, and/or associated with, the application. However, in other situations a party may wish to transfer data between two trusted computing environments, and/or two untrusted computing environments.

In one embodiment, two or more assets, such as computing systems and/or virtual assets, and/or two or more computing environments, in the production environment are connected by one or more communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets and/or computing systems, whether available or known at the time of filing or as later developed.

In one embodiment, the production environment includes one or more cloud computing environments. In various embodiments, the cloud computing environments can be any form of cloud computing environment, such as, but not limited to, a public cloud; a private cloud; a virtual private network (VPN); a subnet; a Virtual Private Cloud, or VPC; a sub-net or any security/communications grouping; or any other cloud-based infrastructure, sub-structure, or architecture, as discussed herein, and/or as known in the art at the time of filing, and/or as developed after the time of filing.

In many cases, a given application or service provided through the production environment may utilize, and interface with, multiple cloud computing environments, such as multiple VPCs, in the course of providing the associated service. In various embodiments, each cloud computing environment includes allocated assets and virtual assets associated with, and controlled or used by, the party utilizing the cloud computing environment.

FIG. 1 is a functional diagram of the interaction of various elements associated with exemplary embodiments of the methods and systems for providing security aware applications discussed herein. Of particular note, the various elements/assets in FIG. 1 are shown for illustrative purposes as being associated with production environment 1 and specific computing environments within production environment 1, such as computing environments 10, 12, 13, 14, and 15. However, the exemplary placement of the various elements/ assets within these environments and systems in FIG. 1 is made for illustrative purposes only and, in various embodiments, any individual element/asset shown in FIG. 1, or combination of elements/assets shown in FIG. 1, can be implemented and/or deployed on any of one or more various computing environments or systems, and/or architectural or infrastructure components, such as one or more hardware systems, one or more software systems, one or more data centers, more or more clouds or cloud types, one or more third party service capabilities, or any other computing environments, architectural, and/or infrastructure components, as discussed herein, and/or as known in the art at the time of filing, and/or as developed/made available after the time of filing.

In addition, the elements shown in FIG. 1, and/or the computing environments, systems and architectural and/or infrastructure components, deploying the elements shown in FIG. 1, can be under the control of, or otherwise associated with, various parties or entities, or multiple parties or entities, such as, but not limited to, the owner of a data center, a party and/or entity providing all or a portion of a cloud-based computing environment, the owner or a provider of an application or service, the owner or provider of one or more resources, and/or any other party and/or entity providing one or more functions, and/or any other party and/or entity as discussed herein, and/or as known in the art at the time of filing, and/or as made known after the time of filing.

In accordance with one embodiment, an application is implemented in a production environment where the application will be, or is, actually deployed, implemented, accessed, and used, as that application is intended to be used.

Consequently, in one embodiment the application is implemented in the production environment to utilize all of the production environment assets, i.e., assets used to implement the application, which are combined; communicatively coupled; virtually and/or physically connected; and/or associated with one another, to provide the production environment implementing the application.

As specific illustrative examples, the application is implemented using, and including, assets such as, but not limited to, the one or more computing environments used to implement the application in the production environment such as a data center, a cloud computing environment, and/or one or more other computing environments in which one or more assets, components, and/or services used to implement the application in the production environment are implemented; the one or more computing systems or computing entities used to implement the application in the production environment; the one or more virtual assets used to implement the application in the production environment; the one or more supervisory or control systems, such as hypervisors, used to implement the application in the production environment; the one or more communications channels used to implement the application in the production environment; the one or more access control systems, such as firewalls and gateways, used to implement the application in the production environment; the one or more routing systems, such as routers and switches, used to implement the application in the production environment; the one or more communications endpoint proxy systems, such as load balancers or buffers, used to implement the application in the production environment; the one or more traffic and/or access control systems used to implement the application in the production environment; the one or more secure communication protocols and/or endpoints, such as Secure Sockets Layer (SSL) protocols, used to implement the application in the production environment; the one or more databases used to implement the application in the production environment; the one or more internal or external services used to implement the application in the production environment; the one or more backend servers or other hardware used to implement the application in the production environment; the one or more software systems used to implement the application in the production environment; and/or any other components making up the actual production environment in which the application is to be deployed, implemented, and run, as discussed herein, and/or as known in the art at the time of filing, and/or as developed after the time of filing.

As noted above, FIG. 1 is a functional diagram of the interaction of various elements associated with one embodiment of a method and system for providing security aware applications discussed herein. In particular, FIG. 1 shows a given application, e.g., application 100 implemented in production environment 1 on server 153 and using various assets.

As seen in FIG. 1, in this specific illustrative example, application 100 is implemented using, and including, assets such as, but not limited to, computing environments 10, 12, 13, 14, and 15, used to implement application 100 in production environment 1, such as a data center, a cloud computing environment, and/or one or more other computing environments in which one or more assets and/or services used to implement application 100 in production environment 1 are deployed.

As seen in FIG. 1, production environment 1 includes computing environment 10, for instance a local area network, or the Internet, that includes users 106 and 108 generating user data traffic 107 and 109, respectively, using one or more computing systems. As seen in FIG. 1, user data traffic 107 and 109 is provided to computing environment 12, such as an access layer or Internet Service Provider (ISP) service used to access application 100, via communications channel 121.

As seen in FIG. 1, production environment 1 includes computing environment 12 which, in turn, includes, as illustrative examples, one or more assets such as router 125, gateway 126, access control 127, and firewall 128. As seen in FIG. 1, in this specific illustrative example, computing environment 12 is commutatively coupled to computing environment 13 of production environment 1 by communications channel 131.

In the specific illustrative example of FIG. 1, computing environment 13 of production environment 1 is a cloud computing environment and includes various virtual assets 133, 134, 135, and 136 used to implement application 100.

In the specific illustrative example of FIG. 1, production environment 1 includes computing environment 14, such as an access control layer, commutatively coupled to computing environment 13 by communications channel 141. In this specific illustrative example, computing environment 14 includes assets such as exemplary access control systems, e.g., one or more of access control 143, endpoint proxy 144, load balancer 145, and protocol endpoint 146.

As seen in the specific illustrative example of FIG. 1, production environment 1 includes computing environment 15, such as a data center or infrastructure provider environment, commutatively coupled computing environment 14 by communications channel 151. In this specific illustrative example, computing environment 15 includes assets such server 153 associated with application 100.

In accordance with one embodiment, one or more trigger events associated with the application, and/or one or more assets used to implement the application, are defined.

In one embodiment, the one or more trigger events are events that when detected in an application, and/or an asset used to implement an application, represent a potential security vulnerability and require at least one responsive action.

In various embodiments, the one or more trigger events defined include, but are not limited to, a change in software associated with the application, and/or an asset used to implement the application, such as a change in the software stack used by the application, and/or one or more assets used to implement the application.

In various embodiments, the one or more trigger events defined include, but are not limited to, the receipt of one or more defined commands by the application, and/or an asset used to implement the application, such as a load library or transfer or copy buffer command.

In various embodiments, the one or more trigger events defined include, but are not limited to, a change in a deployment pattern associated with the application, and/or an asset used to implement the application. For instance, in one embodiment, an asset being deployed in a different location, or used for a different purpose.

In various embodiments, the one or more trigger events defined include, but are not limited to, a change in a communications channel associated with the application, and/or an asset used to implement the application.

In various embodiments, the one or more trigger events defined include, but are not limited to, a change in communications associated with the application, and/or an asset used to implement the application. For instance, in one embodiment, an increase or decrease in traffic during normal or non-business hours for an origin or destination location.

In various embodiments, the one or more trigger events defined include, but are not limited to, a deviation from an expected communications traffic pattern associated with the application, and/or an asset used to implement the application, For instance, in one embodiment, an increase or decrease in traffic from an origin or destination location.

In various embodiments, the one or more trigger events defined include, but are not limited to, a geo-location of the recipient of communications traffic associated with the application, and/or an asset used to implement the application, such as communication traffic to a destination geo-location known to be suspicious and/or associated with malicious parties.

In various embodiments, the one or more trigger events defined include, but are not limited to, a geo-location of the originator of communications traffic associated with the application, and/or an asset used to implement the application, such as communication traffic from an origin geo-location known to be suspicious and/or associated with malicious parties.

In various embodiments, the one or more trigger events defined include, but are not limited to, a change in a pattern of wireless communications associated with the application, and/or an asset used to implement the application.

In various embodiments, the one or more trigger events defined include, but are not limited to, a change in a phone number associated with communications associated with the application, and/or an asset used to implement the application.

In various embodiments, the one or more trigger events defined include, but are not limited to, a change in a user ID associated with a user of the application, and/or an asset used to implement the application.

In various embodiments, the one or more trigger events defined include, but are not limited to, a change in the profile of a user associated with the application, and/or an asset used to implement the application.

In various embodiments, the one or more trigger events defined include, but are not limited to, a change in a periodic event associated with the application, and/or an asset used to implement the application, such as a change in the time, frequency, or day of a periodic backup associated with the application, and/or an asset used to implement the application, or a change in the time, frequency, or day of periodic maintenance or updates associated with the application, and/or an asset used to implement the application.

In various embodiments, the one or more trigger events defined include, but are not limited to, a deviation from any defined expected normal operations parameter associated with the application, and/or an asset used to implement the application.

In various embodiments, the one or more trigger events defined include any trigger events, or combination of trigger events, as discussed herein, and/or as known in the art at the time of filing, and/or as developed after the time of filing.

In one embodiment, at least one responsive action to be associated with each of the one or more trigger events, and to be implemented in response to detection of each of the one or more trigger events, is defined.

In various embodiments, the responsive actions to be associated with each of the one or more trigger events are dependent on the associated trigger events and the level of risk associated with the trigger events.

In various embodiments, the responsive actions to be associated with each of the one or more trigger events include, but are not limited to, notifying a party or entity of the detected trigger event.

In various embodiments, the responsive actions to be associated with each of the one or more trigger events include, but are not limited to, disabling one or more operations performed by the application, and/or an asset used to implement the application, until one or more required actions have taken place, such as an acknowledgement of the notification of the trigger event, and instructions to ignore, or act upon, the trigger event are received.

In various embodiments, the responsive actions to be associated with each of the one or more trigger events include, but are not limited to, permanently disabling one or more operations performed by the application, and/or an asset used to implement the application.

In various embodiments, the responsive actions to be associated with each of the one or more trigger events include, but are not limited to, disabling one or more communications channels associated with the application, and/or an asset used to implement the application, until one or more required actions have taken place, such as an acknowledgement of the notification of the trigger event, and instructions to ignore, or act upon, the trigger event are received.

In various embodiments, the responsive actions to be associated with each of the one or more trigger events include, but are not limited to, permanently disabling one or more communications channels associated with the application, and/or an asset used to implement the application.

In various embodiments, the responsive actions to be associated with each of the one or more trigger events include, but are not limited to, blocking a portion of communications traffic associated with the application, and/or an asset used to implement the application, until one or more required actions have taken place, such as an acknowledgement of the notification of the trigger event, and instructions to ignore, or act upon, the trigger event are received.

In various embodiments, the responsive actions to be associated with each of the one or more trigger events include, but are not limited to, permanently blocking a portion of communications traffic associated with the application, and/or an asset used to implement the application.

In various embodiments, the responsive actions to be associated with each of the one or more trigger events include, but are not limited to, disabling the application, and/or an asset used to implement the application, until one or more required actions have taken place, such as an acknowledgement of the notification of the trigger event, and instructions to ignore, or act upon, the trigger event are received.

In various embodiments, the responsive actions to be associated with each of the one or more trigger events include, but are not limited to, permanently disabling the application, and/or an asset used to implement the application, until one or more required actions have taken place.

In various embodiments, the responsive actions to be associated with each of the one or more trigger events include, but are not limited to, obtaining data from the application, and/or an asset used to implement the application, before disabling the application, and/or an asset used to implement the application.

In various embodiments, the responsive actions to be associated with each of the one or more trigger events include, but are not limited to, directing a transfer of data from the application, and/or an asset used to implement the application, to a location outside the application, and/or an asset used to implement the application, before disabling the application, and/or an asset used to implement the application.

In one embodiment, data representing instructions for monitoring and detecting the one or more trigger events in an asset used to implement the application is generated.

In one embodiment, data representing instructions for implementing the at least one responsive action associated with each of the one or more trigger events in response to detection of the trigger event is generated.

In one embodiment, the data representing instructions for monitoring and detecting the one or more trigger events in an asset used to implement the application and the data representing instructions for implementing the at least one responsive action associated with each of the one or more trigger events in response to detection of the trigger event is provided to the application, and/or one or more assets used to implement the application.

In one embodiment, the data representing instructions for monitoring and detecting the one or more trigger events in an asset used to implement the application and the data representing instructions for implementing the at least one responsive action associated with each of the one or more trigger events in response to detection of the trigger event is provided to the application in the form of a security policy library that is required to be loaded into the application at the time of implementation or startup as part of the application's mandatory configuration. In one embodiment, each application, or application type, is provided a security policy library customized to that particular application and/or application type.

In various embodiments, the security policy library includes, in addition to, and/or as part of, the data representing instructions for monitoring and detecting the one or more trigger events in an asset used to implement the application and the data representing instructions for implementing the at least one responsive action associated with each of the one or more trigger events in response to detection of the trigger event, codified security policies, regulatory compliance policies, deployment-dependent policies, run-time specific policies, and/or application-dependent policies.

For example, in one embodiment, the security policy library may have maximum and minimum rates of customer requests that are considered "normal". In one embodiment, the security policy library may include instructions for "auto throttle" implementation if these maximum and minimum rates are exceeded, or not met.

In one embodiment, the security policy library may include instructions for identifying rates of change of customer requests considered normal, or have instructions for implementing policies that inspect the origin of customer requests and decide safe or unsafe origins, or for establishing and monitoring "safe ranges" of rates of requests coming from different areas taking into account environmental parameters such as time of day and location of the service.

In one embodiment, the security policy library may include instructions for identifying and monitoring volumes of failures, or rates of failure, coming from a specific IP address and if the failures, or rates of failure, coming from a specific IP address exceed a threshold level, then blacklisting or blocking all requests from that IP address "at the border" of the application.

In one embodiment, the security policy library may include instructions for using profiles of the responses so that if a collection of responses deviates "from normal" by a given threshold then the application automatically implements a responsive action, or if there is "output of data" per request that deviates from normal, the application automatically implements a responsive action.

In various embodiments, the security policy library is dynamic and can be modified over time to present an open-ended collection of self-inspecting checks, i.e., an open ended set of defined trigger events, and data representing instructions for monitoring and detecting the one or more trigger events in an asset used to implement the application. Likewise, in various embodiments, the security policy library is dynamic and can be modified over time to present an open-ended collection of responsive actions, and data representing instructions for implementing the responsive actions, associated with each of the one or more trigger events.

In various embodiments, the security policy library, and/or the data representing instructions for monitoring and detecting the one or more trigger events in an asset, and/or the data representing instructions for implementing the at least one responsive action associated with each of the one or more trigger events, is provided to the application, and/or one or more assets used to implement the application, by the owner of the application, as either a push, or pull, operation.

In various embodiments, the security policy library, and/or the data representing instructions for monitoring and detecting the one or more trigger events in an asset, and/or the data representing instructions for implementing the at least one responsive action associated with each of the one or more trigger events, is provided to the application, and/or one or more assets used to implement the application, by a provider of at least part of the production environment in which the application is implemented, as either a push, or pull, operation.

In various embodiments, the security policy library, and/or the data representing instructions for monitoring and detecting the one or more trigger events in an asset, and/or the data representing instructions for implementing the at least one responsive action associated with each of the one or more trigger events, is provided to the application, and/or one or more assets used to implement the application, by a third party service provider, as either a push, or pull, operation.

Returning to FIG. 1, security policy library 111 is shown as being implemented in process module 110 associated with application 100 and implemented on server 153.

In one embodiment, at least part of the data representing instructions for monitoring and detecting the one or more trigger events in an asset is provided to at least one asset used to implement the application.

In various embodiments at least part of the data representing instructions for monitoring and detecting the one or more trigger events in an asset is provided to at least one asset used to implement the application to be used by the at least one asset to monitor for the defined trigger events.

In various embodiments, the at least part of the data representing instructions for monitoring and detecting one or more trigger events is provided to the at least one asset in a memory or other data store associated with the at least one asset.

In some embodiments, in addition to at least part of the data representing instructions for monitoring and detecting one or more trigger events being provided to the at least one asset, at least part of the data representing instructions for implementing at least one responsive action associated with each of the one or more trigger events is also transferred to the at least one asset. In various embodiments, the at least part of the data representing instructions for implementing at least one responsive action associated with each of the one or more trigger events transferred to the at least one asset includes data for simply reporting the detected one or more trigger events, when detected. In various embodiments, the at least part of the data representing instructions for implementing at least one responsive action associated with each of the one or more trigger events transferred to the at least one asset includes data for implementing one or more responsive actions at the asset level in response to the detection of one or more trigger events.

In one embodiment, where the at least one asset is a virtual asset, the at least part of the data representing instructions for monitoring and detecting one or more trigger events is provided to the at least one virtual asset through a virtual asset creation template used to create, and or instantiate, the at least one virtual asset in a cloud computing environment.

As noted above, typically, virtual assets are created, or instantiated, using steps, instructions, processes, code, or "recipes" referred to herein as "virtual asset creation templates." Typically, virtual assets that have the same, or similar, operational parameters are created using the same "virtual asset creation templates."

Examples of virtual asset creation templates include, but are not limited to, any tool and/or system for creating and managing a collection of related cloud resources. One specific illustrative example of such a virtual asset creation template is a cloud formation template such as any of the Amazon Web Service (AWS) cloud formation tools/templates.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or system.

Other examples of virtual asset creation templates include, but are not limited to, any virtual appliance used to instantiate virtual assets. One specific illustrative example of such a virtual asset creation template is an Amazon Machine Image (AMI).

Figure 2:
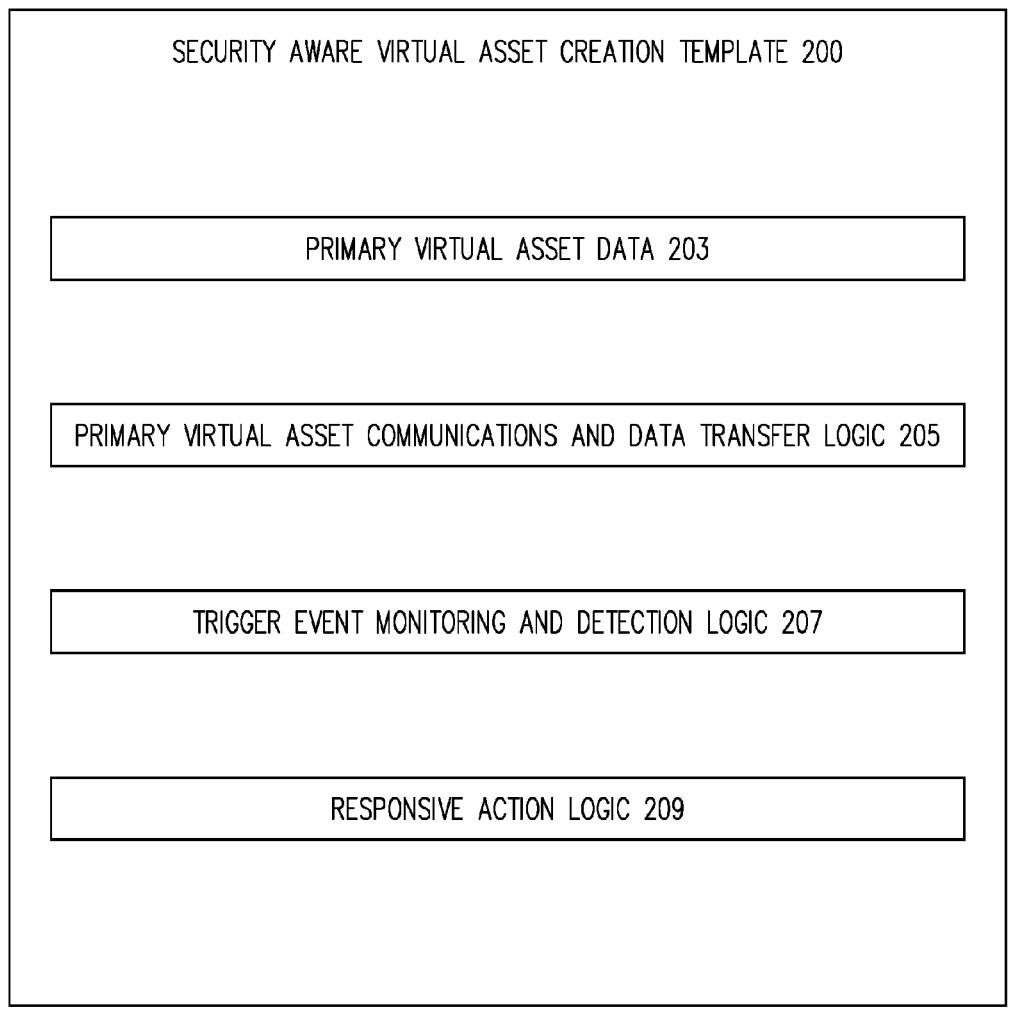
FIG. 2 is a functional diagram of a security aware virtual asset creation template in accordance with one embodiment.

Other examples of virtual asset creation templates include, but are not limited to, any virtual appliance, or tool, or system, or framework, used to instantiate virtual assets as discussed herein, and/or as known/available in the art at the time of filing, and/or as developed/made available after the time of filing. In FIG. 2 is a functional diagram of part of the operational logic of a security aware virtual asset creation template 200 for creating a security aware virtual asset, such as any of the virtual assets 133, 134, 135, and/or 136 of FIG. 1, in accordance with one embodiment.

As seen in FIG. 2, in one embodiment, security aware virtual asset creation template 200 includes primary virtual asset data 203.

In one embodiment, primary virtual asset data 203 includes primary virtual asset data, logic and instructions, associated with the security aware virtual asset itself, and/or the normal functions and operations of the security aware virtual asset, and/or the operating environment of the security aware virtual asset, such as a cloud computing environment and/or one or more management systems for the cloud computing environment.

As specific illustrative examples, in various embodiments, the primary virtual asset data includes, but is not limited to, one or more of, data indicating the security aware virtual asset's identification; data indicating the region associated with the security aware virtual asset; data indicating the availability zone associated with the security aware virtual asset; data representing and/or indicating software modules and code residing within, or assigned to, the security aware virtual asset; data indicating a number of software modules residing within, or associated with, the security aware virtual asset; data representing or indicating files and/or file names residing within, or assigned to, the security aware virtual asset; data representing and/or indicating the exact configuration of the security aware virtual asset; data indicating a boot sequence for the security aware virtual asset; any data provided by a hypervisor or virtualization layer associated with the security aware virtual asset; any data provided from a cloud control plane associated with the security aware virtual asset; any data provided by any management system associated with the computing environment of the security aware virtual asset; and/or any combination of "inside" or "normal" operational virtual asset data as discussed herein, and/or as known in the art at the time of filing, and/or as developed after the time of filing.

In one embodiment, using at least part of the security aware virtual asset creation data, a security aware virtual asset can be instantiated, or launched, in a computing environment. In one embodiment, as a specific illustrative example, the security aware virtual asset is a security aware virtual machine, or security aware server instance, to be launched in a cloud computing environment.

In one embodiment, security aware virtual asset creation template 200 includes primary virtual asset communications and data transfer logic 205. In various embodiments, primary virtual asset communications and data transfer logic 205 includes logic and instructions for providing "normal" communications channels and data transfer mechanisms to be used by the security aware virtual asset once the security aware virtual asset is instantiated, and/or deployed, in a computing environment.

In one embodiment, security aware virtual asset creation template 200 includes trigger event monitoring and detection logic 207. In one embodiment, trigger event monitoring and detection logic 207 includes instructions and data for monitoring and detecting one or more trigger events as received from a security policy library, such as security policy library 111 of FIG. 1.

Returning to FIG. 2, in one embodiment, security aware virtual asset creation template 200 includes responsive action logic 209. In one embodiment, responsive action logic 209 includes data and instructions for implementing at least one responsive action associated with each of the one or more trigger events of trigger event monitoring and detection logic 207. In various embodiments, responsive action logic 209 includes logic for simply reporting the detected one or more trigger events, when detected. In other embodiments, responsive action logic 209 includes logic for implementing one or more responsive actions at the virtual asset level in response to the detection of one or more trigger events.

In one embodiment, the at least part of the data representing instructions for monitoring and detecting the one or more trigger events in an asset is used by the at least one asset to detect a trigger event involving the at least one asset.

In one embodiment, at least part of the data representing instructions for implementing the at least one responsive action associated with each of the one or more trigger events is then used to automatically implement the at least one responsive action associated with the detected trigger event.

Using the method and system for providing security aware applications discussed above, security aware assets are used to implement security aware applications that can self-monitor and self-alarm, or respond, to various security vulnerabilities and breach events.

In one embodiment, baseline values are determined for various operational parameters associated with the application, and/or the assets used to implement the application. Then any defined deviations from these baseline values are also defined as trigger events requiring one or more responsive actions.

In accordance with one embodiment, an application is implemented in a production environment where the application will be, or is, actually deployed, implemented, accessed, and used, as that application is intended to be used.

Consequently, in one embodiment the application is implemented in the production environment to utilize all of the production environment assets, i.e., assets used to implement the application, which are combined; communicatively coupled; virtually and/or physically connected; and/or associated with one another, to provide the production environment implementing the application.

As specific illustrative examples, the application is implemented using, and including, assets such as, but not limited to, the one or more computing environments used to implement the application in the production environment such as a data center, a cloud computing environment, and/or one or more other computing environments in which one or more assets, components, and/or services used to implement the application in the production environment are implemented; the one or more computing systems or computing entities used to implement the application in the production environment; the one or more virtual assets used to implement the application in the production environment; the one or more supervisory or control systems, such as hypervisors, used to implement the application in the production environment; the one or more communications channels used to implement the application in the production environment; the one or more access control systems, such as firewalls and gateways, used to implement the application in the production environment; the one or more routing systems, such as routers and switches, used to implement the application in the production environment; the one or more communications endpoint proxy systems, such as load balancers or buffers, used to implement the application in the production environment; the one or more traffic and/or access control systems used to implement the application in the production environment; the one or more secure communication protocols and/or endpoints, such as Secure Sockets Layer (SSL) protocols, used to implement the application in the production environment; the one or more databases used to implement the application in the production environment; the one or more internal or external services used to implement the application in the production environment; the one or more backend servers or other hardware used to implement the application in the production environment; the one or more software systems used to implement the application in the production environment; and/or any other components making up the actual production environment in which the application is to be deployed, implemented, and run, as discussed herein, and/or as known in the art at the time of filing, and/or as developed after the time of filing.

In one embodiment, one or more operational parameters associated with assets used to implement the application are defined.

In one embodiment, the one or more operational parameters associated with assets used to implement the application are defined based on their being parameters that are likely to be affected, or associated with, one or more security vulnerabilities or attacks.

In one embodiment, the defined one or more operational parameters associated with assets used to implement the application include, but are not limited to, a deployment pattern associated with the application, and/or an asset used to implement the application.

In one embodiment, the defined one or more operational parameters associated with assets used to implement the application include, but are not limited to, communications channels associated with the application, and/or an asset used to implement the application.

In one embodiment, the defined one or more operational parameters associated with assets used to implement the application include, but are not limited to, communications channel configurations associated with the application, and/or an asset used to implement the application.

In one embodiment, the defined one or more operational parameters associated with assets used to implement the application include, but are not limited to, communications traffic patterns associated with the application, and/or an asset used to implement the application.

In one embodiment, the defined one or more operational parameters associated with assets used to implement the application include, but are not limited to, wireless communications associated with the application, and/or an asset used to implement the application.

In one embodiment, the defined one or more operational parameters associated with assets used to implement the application include, but are not limited to, periodic events associated with the application, and/or an asset used to implement the application.

In one embodiment, the defined one or more operational parameters associated with assets used to implement the application include any operational parameter, or combination of operational parameters, as discussed herein, and/or as known in the art at the time of filing, and/or as developed after the time of filing.

In one embodiment, baseline values for the one or more operational parameters associated with assets used to implement the application are obtained and/or defined.

In one embodiment, the baseline values for the operational parameters obtained are based on historical operational data for the application, and/or one or more assets used to implement the application.

In one embodiment, the baseline values for the operational parameters obtained are based on predicted operational data for the application, and/or one or more assets used to implement the application.

In one embodiment, the baseline values for the operational parameters are obtained from a third party.

In one embodiment, a trigger deviation value for each of the one or more operational parameters associated with assets used to implement the application are defined.

In accordance with one embodiment, one or more trigger events associated with the application, and/or one or more assets used to implement the application, are defined and include the occurrence of a trigger deviation value for any of the one or more operational parameters associated with assets used to implement the application.

In one embodiment, the one or more trigger events are events that when detected in an application, and/or an asset used to implement an application, represent a potential security vulnerability and require at least one responsive action.

As noted above, in one embodiment, the one or more trigger events defined include, but are not limited to, the occurrence of a trigger deviation value for any of the one or more operational parameters associated with assets used to implement the application.

In various embodiments, the one or more trigger events defined include, but are not limited to, a change in software associated with the application, and/or an asset used to implement the application, such as a change in the software stack used by the application, and/or one or more assets used to implement the application.

In various embodiments, the one or more trigger events defined include, but are not limited to, the receipt of one or more defined commands by the application, and/or an asset used to implement the application, such as a load library or transfer or copy buffer command.

In various embodiments, the one or more trigger events defined include, but are not limited to, a change in a deployment pattern associated with the application, and/or an asset used to implement the application. For instance, in one embodiment, an asset being deployed in a different location, or used for a different purpose.

In various embodiments, the one or more trigger events defined include, but are not limited to, a change in a communications channel associated with the application, and/or an asset used to implement the application.

In various embodiments, the one or more trigger events defined include, but are not limited to, a change in communications associated with the application, and/or an asset used to implement the application. For instance, in one embodiment, an increase or decrease in traffic during normal or non-business hours for an origin or destination location.

In various embodiments, the one or more trigger events defined include, but are not limited to, a deviation from an expected communications traffic pattern associated with the application, and/or an asset used to implement the application, For instance, in one embodiment, an increase or decrease in traffic from an origin or destination location.

In various embodiments, the one or more trigger events defined include, but are not limited to, a geo-location of the recipient of communications traffic associated with the application, and/or an asset used to implement the application, such as communication traffic to a destination geo-location known to be suspicious and/or associated with malicious parties.

In various embodiments, the one or more trigger events defined include, but are not limited to, a geo-location of the originator of communications traffic associated with the application, and/or an asset used to implement the application, such as communication traffic from an origin geo-location known to be suspicious and/or associated with malicious parties.

In various embodiments, the one or more trigger events defined include, but are not limited to, a change in a pattern of wireless communications associated with the application, and/or an asset used to implement the application.

In various embodiments, the one or more trigger events defined include, but are not limited to, a change in a phone number associated with communications associated with the application, and/or an asset used to implement the application.

In various embodiments, the one or more trigger events defined include, but are not limited to, a change in a user ID associated with a user of the application, and/or an asset used to implement the application.

In various embodiments, the one or more trigger events defined include, but are not limited to, a change in the profile of a user associated with the application, and/or an asset used to implement the application.

In various embodiments, the one or more trigger events defined include, but are not limited to, a change in a periodic event associated with the application, and/or an asset used to implement the application, such as a change in the time, frequency, or day of a periodic backup associated with the application, and/or an asset used to implement the application, or a change in the time, frequency, or day of periodic maintenance or updates associated with the application, and/or an asset used to implement the application.

In various embodiments, the one or more trigger events defined include, but are not limited to, a deviation from any defined expected normal operations parameter associated with the application, and/or an asset used to implement the application.

In various embodiments, the one or more trigger events defined include any trigger events, or combination of trigger events, as discussed herein, and/or as known in the art at the time of filing, and/or as developed after the time of filing.

In one embodiment, at least one responsive action to be associated with each of the one or more trigger events, and to be implemented in response to detection of each of the one or more trigger events, is defined.

In various embodiments, the responsive actions to be associated with each of the one or more trigger events are dependent on the associated trigger events and the level of risk associated with the trigger events.

In various embodiments, the responsive actions to be associated with each of the one or more trigger events include, but are not limited to, notifying a party or entity of the detected trigger event.

In various embodiments, the responsive actions to be associated with each of the one or more trigger events include, but are not limited to, disabling one or more operations performed by the application, and/or an asset used to implement the application, until one or more required actions have taken place, such as an acknowledgement of the notification of the trigger event, and instructions to ignore, or act upon, the trigger event are received.

In various embodiments, the responsive actions to be associated with each of the one or more trigger events include, but are not limited to, permanently disabling one or more operations performed by the application, and/or an asset used to implement the application.

In various embodiments, the responsive actions to be associated with each of the one or more trigger events include, but are not limited to, disabling one or more communications channels associated with the application, and/or an asset used to implement the application, until one or more required actions have taken place, such as an acknowledgement of the notification of the trigger event, and instructions to ignore, or act upon, the trigger event are received.

In various embodiments, the responsive actions to be associated with each of the one or more trigger events include, but are not limited to, permanently disabling one or more communications channels associated with the application, and/or an asset used to implement the application.

In various embodiments, the responsive actions to be associated with each of the one or more trigger events include, but are not limited to, blocking a portion of communications traffic associated with the application, and/or an asset used to implement the application, until one or more required actions have taken place, such as an acknowledgement of the notification of the trigger event, and instructions to ignore, or act upon, the trigger event are received.

In various embodiments, the responsive actions to be associated with each of the one or more trigger events include, but are not limited to, permanently blocking a portion of communications traffic associated with the application, and/or an asset used to implement the application.

In various embodiments, the responsive actions to be associated with each of the one or more trigger events include, but are not limited to, disabling the application, and/or an asset used to implement the application, until one or more required actions have taken place, such as an acknowledgement of the notification of the trigger event, and instructions to ignore, or act upon, the trigger event are received.

In various embodiments, the responsive actions to be associated with each of the one or more trigger events include, but are not limited to, permanently disabling the application, and/or an asset used to implement the application, until one or more required actions have taken place.

In various embodiments, the responsive actions to be associated with each of the one or more trigger events include, but are not limited to, obtaining data from the application, and/or an asset used to implement the application, before disabling the application, and/or an asset used to implement the application.

In various embodiments, the responsive actions to be associated with each of the one or more trigger events include, but are not limited to, directing a transfer of data from the application, and/or an asset used to implement the application, to a location outside the application, and/or an asset used to implement the application, before disabling the application, and/or an asset used to implement the application.

In one embodiment, data representing instructions for monitoring and detecting the one or more trigger events in an asset used to implement the application is generated.

In one embodiment, data representing instructions for implementing the at least one responsive action associated with each of the one or more trigger events in response to detection of the trigger event is generated.

In one embodiment, the data representing instructions for monitoring and detecting the one or more trigger events in an asset used to implement the application and the data representing instructions for implementing the at least one responsive action associated with each of the one or more trigger events in response to detection of the trigger event is provided to the application, and/or one or more assets used to implement the application.

In one embodiment, the data representing instructions for monitoring and detecting the one or more trigger events in an asset used to implement the application and the data representing instructions for implementing the at least one responsive action associated with each of the one or more trigger events in response to detection of the trigger event is provided to the application in the form of a security policy library that is required to be loaded into the application at the time of implementation or startup as part of the application's mandatory configuration. In one embodiment, each application, or application type, is provided a security policy library customized to that particular application and/or application type.

In various embodiments, the security policy library includes, in addition to, and/or as part of, the data representing instructions for monitoring and detecting the one or more trigger events in an asset used to implement the application and the data representing instructions for implementing the at least one responsive action associated with each of the one or more trigger events in response to detection of the trigger event, codified security policies, regulatory compliance policies, deployment-dependent policies, run-time specific policies, and/or application-dependent policies.

For example, in one embodiment, the security policy library may have maximum and minimum rates of customer requests that are considered "normal". In one embodiment, the security policy library may include instructions for "auto throttle" implementation if these maximum and minimum rates are exceeded, or not met.

In one embodiment, the security policy library may include instructions for identifying rates of change of customer requests considered normal, or have instructions for implementing policies that inspect the origin of customer requests and decide safe or unsafe origins, or for establishing and monitoring "safe ranges" of rates of requests coming from different areas taking into account environmental parameters such as time of day and location of the service.

In one embodiment, the security policy library may include instructions for identifying and monitoring volumes of failures, or rates of failure, coming from a specific IP address and if the failures, or rates of failure, coming from a specific IP address exceed a threshold level, then blacklisting or blocking all requests from that IP address "at the border" of the application.

In one embodiment, the security policy library may include instructions for using profiles of the responses so that if a collection of responses deviates "from normal" by a given threshold then the application automatically implements a responsive action, or if there is "output of data" per request that deviates from normal, the application automatically implements a responsive action.

In various embodiments, the security policy library is dynamic and can be modified over time to present an open-ended collection of self-inspecting checks, i.e., an open ended set of defined trigger events, and data representing instructions for monitoring and detecting the one or more trigger events in an asset used to implement the application. Likewise, in various embodiments, the security policy library is dynamic and can be modified over time to present an open-ended collection of responsive actions, and data representing instructions for implementing the responsive actions, associated with each of the one or more trigger events.

In various embodiments, the security policy library, and/or the data representing instructions for monitoring and detecting the one or more trigger events in an asset, and/or the data representing instructions for implementing the at least one responsive action associated with each of the one or more trigger events, is provided to the application, and/or one or more assets used to implement the application, by the owner of the application, as either a push, or pull, operation.

In various embodiments, the security policy library, and/or the data representing instructions for monitoring and detecting the one or more trigger events in an asset, and/or the data representing instructions for implementing the at least one responsive action associated with each of the one or more trigger events, is provided to the application, and/or one or more assets used to implement the application, by a provider of at least part of the production environment in which the application is implemented, as either a push, or pull, operation.

In various embodiments, the security policy library, and/or the data representing instructions for monitoring and detecting the one or more trigger events in an asset, and/or the data representing instructions for implementing the at least one responsive action associated with each of the one or more trigger events, is provided to the application, and/or one or more assets used to implement the application, by a third party service provider, as either a push, or pull, operation.

In one embodiment, at least part of the data representing instructions for monitoring and detecting the one or more trigger events in an asset is provided to at least one asset used to implement the application.

In various embodiments at least part of the data representing instructions for monitoring and detecting the one or more trigger events in an asset is provided to at least one asset used to implement the application to be used by the at least one asset to monitor for the defined trigger events.

In various embodiments, the at least part of the data representing instructions for monitoring and detecting one or more trigger events is provided to the at least one asset in a memory or other data store associated with the at least one asset.

In some embodiments, in addition to at least part of the data representing instructions for monitoring and detecting one or more trigger events being provided to the at least one asset, at least part of the data representing instructions for implementing at least one responsive action associated with each of the one or more trigger events is also transferred to the at least one asset. In various embodiments, the at least part of the data representing instructions for implementing at least one responsive action associated with each of the one or more trigger events transferred to the at least one asset includes data for simply reporting the detected one or more trigger events, when detected. In various embodiments, the at least part of the data representing instructions for implementing at least one responsive action associated with each of the one or more trigger events transferred to the at least one asset includes data for implementing one or more responsive actions at the asset level in response to the detection of one or more trigger events.

In one embodiment, where the at least one asset is a virtual asset, the at least part of the data representing instructions for monitoring and detecting one or more trigger events is provided to the at least one virtual asset through a virtual asset creation template used to create, and or instantiate, the at least one virtual asset in a cloud computing environment.

In one embodiment, the at least part of the data representing instructions for monitoring and detecting the one or more trigger events in an asset is used by the at least one asset to detect a trigger event involving the at least one asset.

In one embodiment, at least part of the data representing instructions for implementing the at least one responsive action associated with each of the one or more trigger events is then used to automatically implement the at least one responsive action associated with the detected trigger event.

Using the method and system for providing security aware applications discussed above, baseline operational data and security aware assets are used to implement security aware applications that can self-monitor and self-alarm, or respond, to various security vulnerabilities and breach events.
Process In accordance with one embodiment, a process for providing security aware applications includes defining one or more trigger events that when detected in an asset used to implement an application require at least one responsive action. In one embodiment, at least one responsive action to be associated with each of the one or more trigger events, and to be implemented in response to detection of each of the one or more trigger events, is defined.

In one embodiment, data representing instructions for monitoring and detecting the one or more trigger events in an asset used to implement the application is generated. In one embodiment, data representing instructions for implementing the at least one responsive action associated with each of the one or more trigger events in response to detection of the trigger event is generated. In one embodiment, at least part of the data representing instructions for monitoring and detecting the one or more trigger events in an asset is provided to at least one asset used to implement the application.

In one embodiment, the at least part of the data representing instructions for monitoring and detecting the one or more trigger events in an asset is used by the at least one asset to detect a trigger event involving the at least one asset. In one embodiment, at least part of the data representing instructions for implementing the at least one responsive action associated with each of the one or more trigger events is then used to automatically implement the at least one responsive action associated with the detected trigger event.

Figure 3:
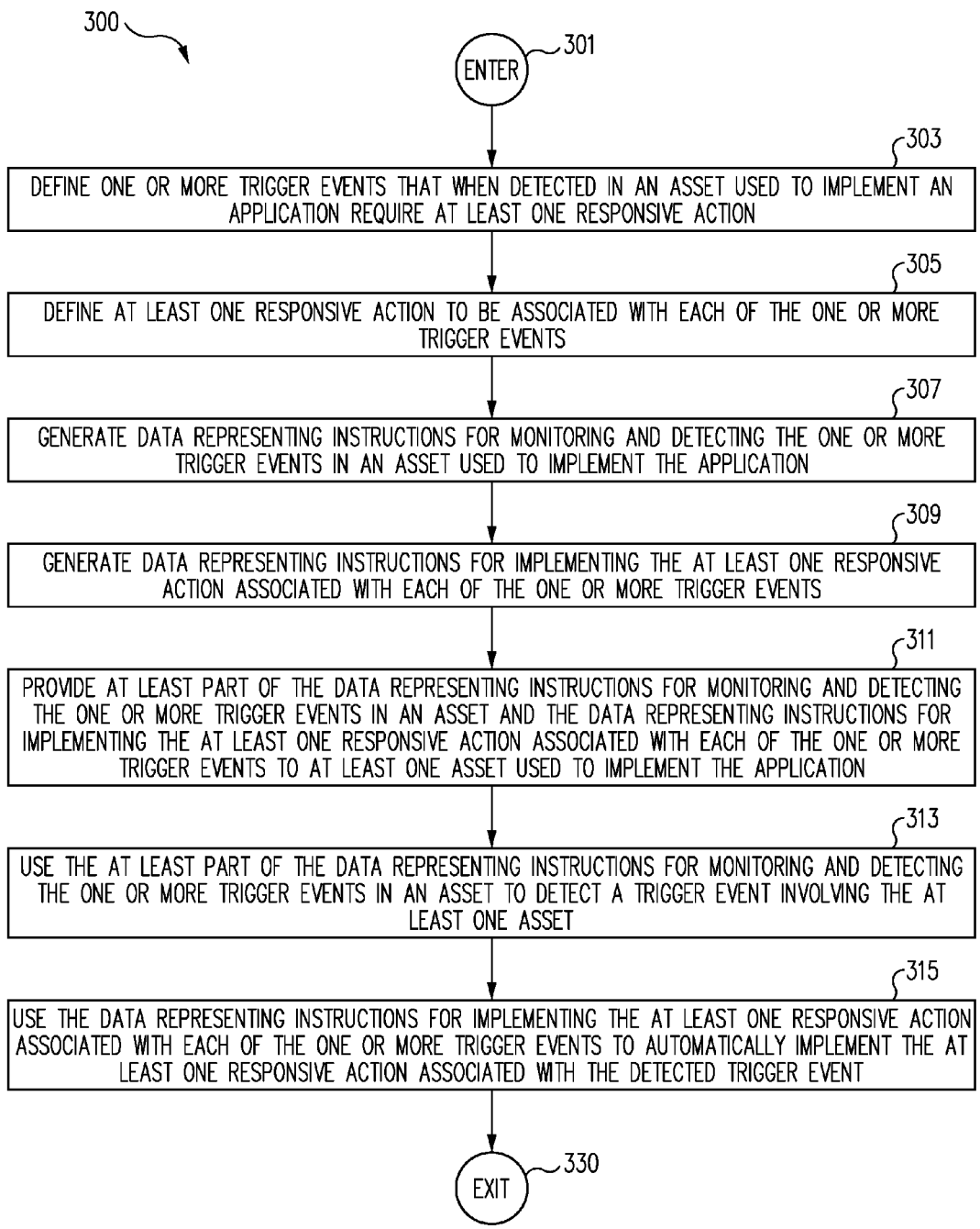
FIG. 3 is a flow chart depicting a process for providing security aware applications in accordance with one embodiment.

FIG. 3 is a flow chart of a process 300 for providing security aware applications in accordance with one embodiment. In one embodiment, process 300 for providing security aware applications begins at ENTER OPERATION 301 of FIG. 3 and process flow proceeds to DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303.

In one embodiment, at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 one or more trigger events associated with the application, and/or one or more assets used to implement the application, are defined.

In one embodiment, the one or more trigger events of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 are events that when detected in an application, and/or an asset used to implement an application, represent a potential security vulnerability and require at least one responsive action.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, the receipt of one or more defined commands by the application, and/or an asset used to implement the application, such as a load library or transfer or copy buffer command.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, a change in a deployment pattern associated with the application, and/or an asset used to implement the application. For instance, in one embodiment, an asset being deployed in a different location, or used for a different purpose.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, a change in a communications channel associated with the application, and/or an asset used to implement the application.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, a change in communications associated with the application, and/or an asset used to implement the application. For instance, in one embodiment, an increase or decrease in traffic during normal or non-business hours for an origin or destination location.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, a deviation from an expected communications traffic pattern associated with the application, and/or an asset used to implement the application, For instance, in one embodiment, an increase or decrease in traffic from an origin or destination location.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, a geo-location of the recipient of communications traffic associated with the application, and/or an asset used to implement the application, such as communication traffic to a destination geo-location known to be suspicious and/or associated with malicious parties.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, a geo-location of the originator of communications traffic associated with the application, and/or an asset used to implement the application, such as communication traffic from an origin geo-location known to be suspicious and/or associated with malicious parties.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, a change in a pattern of wireless communications associated with the application, and/or an asset used to implement the application.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, a change in a phone number associated with communications associated with the application, and/or an asset used to implement the application.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, a change in a user ID associated with a user of the application, and/or an asset used to implement the application.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, a change in the profile of a user associated with the application, and/or an asset used to implement the application.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, a change in a periodic event associated with the application, and/or an asset used to implement the application, such as a change in the time, frequency, or day of a periodic backup associated with the application, and/or an asset used to implement the application, or a change in the time, frequency, or day of periodic maintenance or updates associated with the application, and/or an asset used to implement the application.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, a deviation from any defined expected normal operations parameter associated with the application, and/or an asset used to implement the application.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include any trigger events, or combination of trigger events, as discussed herein, and/or as known in the art at the time of filing, and/or as developed after the time of filing.

In one embodiment, once one or more trigger events associated with the application, and/or one or more assets used to implement the application, are defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303, process flow proceeds to DEFINE AT LEAST ONE RESPONSIVE ACTION TO BE ASSOCIATED WITH EACH OF THE ONE OR MORE TRIGGER EVENTS OPERATION 305.

In one embodiment, at DEFINE AT LEAST ONE RESPONSIVE ACTION TO BE ASSOCIATED WITH EACH OF THE ONE OR MORE TRIGGER EVENTS OPERATION 305 at least one responsive action to be associated with each of the one or more trigger events of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303, and to be implemented in response to detection of each of the one or more trigger events of DEFINE ONE OR MORE TRIGGER EVENTS THAT WHEN DETECTED IN AN ASSET USED TO IMPLE- MENT AN APPLICATION REQUIRE AT LEAST ONE RESPONSIVE ACTION OPERATION 303, is defined.

In various embodiments, the responsive actions to be associated with each of the one or more trigger events of DEFINE AT LEAST ONE RESPONSIVE ACTION TO BE ASSOCIATED WITH EACH OF THE ONE OR MORE TRIGGER EVENTS OPERATION 305 are dependent on the associated trigger events and the level of risk associated with the trigger events of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303.

In various embodiments, the responsive actions of DEFINE AT LEAST ONE RESPONSIVE ACTION TO BE ASSOCIATED WITH EACH OF THE ONE OR MORE TRIGGER EVENTS OPERATION 305 to be associated with each of the one or more trigger events of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, notifying a party or entity of the detected trigger event.

In various embodiments, the responsive actions of DEFINE AT LEAST ONE RESPONSIVE ACTION TO BE ASSOCIATED WITH EACH OF THE ONE OR MORE TRIGGER EVENTS OPERATION 305 to be associated with each of the one or more trigger events of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, disabling one or more operations performed by the application, and/or an asset used to implement the application, until one or more required actions have taken place, such as an acknowledgement of the notification of the trigger event, and instructions to ignore, or act upon, the trigger event are received.

In various embodiments, the responsive actions of DEFINE AT LEAST ONE RESPONSIVE ACTION TO BE ASSOCIATED WITH EACH OF THE ONE OR MORE TRIGGER EVENTS OPERATION 305 to be associated with each of the one or more trigger events of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, permanently disabling one or more operations performed by the application, and/or an asset used to implement the application.

In various embodiments, the responsive actions of DEFINE AT LEAST ONE RESPONSIVE ACTION TO BE ASSOCIATED WITH EACH OF THE ONE OR MORE TRIGGER EVENTS OPERATION 305 to be associated with each of the one or more trigger events of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, disabling one or more communications channels associated with the application, and/or an asset used to implement the application, until one or more required actions have taken place, such as an acknowledgement of the notification of the trigger event, and instructions to ignore, or act upon, the trigger event are received.

In various embodiments, the responsive actions of DEFINE AT LEAST ONE RESPONSIVE ACTION TO BE ASSOCIATED WITH EACH OF THE ONE OR MORE TRIGGER EVENTS OPERATION 305 to be associated with each of the one or more trigger events of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, permanently disabling one or more communications channels associated with the application, and/or an asset used to implement the application.

In various embodiments, the responsive actions of DEFINE AT LEAST ONE RESPONSIVE ACTION TO BE ASSOCIATED WITH EACH OF THE ONE OR MORE TRIGGER EVENTS OPERATION 305 to be associated with each of the one or more trigger events of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, blocking a portion of communications traffic associated with the application, and/or an asset used to implement the application, until one or more required actions have taken place, such as an acknowledgement of the notification of the trigger event, and instructions to ignore, or act upon, the trigger event are received.

In various embodiments, the responsive actions of DEFINE AT LEAST ONE RESPONSIVE ACTION TO BE ASSOCIATED WITH EACH OF THE ONE OR MORE TRIGGER EVENTS OPERATION 305 to be associated with each of the one or more trigger events of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, permanently blocking a portion of communications traffic associated with the application, and/or an asset used to implement the application.

In various embodiments, the responsive actions of DEFINE AT LEAST ONE RESPONSIVE ACTION TO BE ASSOCIATED WITH EACH OF THE ONE OR MORE TRIGGER EVENTS OPERATION 305 to be associated with each of the one or more trigger events of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, disabling the application, and/or an asset used to implement the application, until one or more required actions have taken place, such as an acknowledgement of the notification of the trigger event, and instructions to ignore, or act upon, the trigger event are received.

In various embodiments, the responsive actions of DEFINE AT LEAST ONE RESPONSIVE ACTION TO BE ASSOCIATED WITH EACH OF THE ONE OR MORE TRIGGER EVENTS OPERATION 305 to be associated with each of the one or more trigger events of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, permanently disabling the application, and/or an asset used to implement the application, until one or more required actions have taken place.

In various embodiments, the responsive actions of DEFINE AT LEAST ONE RESPONSIVE ACTION TO BE ASSOCIATED WITH EACH OF THE ONE OR MORE TRIGGER EVENTS OPERATION 305 to be associated with each of the one or more trigger events of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, obtaining data from the application, and/or an asset used to implement the application, before disabling the application, and/or an asset used to implement the application.

In various embodiments, the responsive actions of DEFINE AT LEAST ONE RESPONSIVE ACTION TO BE ASSOCIATED WITH EACH OF THE ONE OR MORE TRIGGER EVENTS OPERATION 305 to be associated with each of the one or more trigger events of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303 include, but are not limited to, directing a transfer of data from the application, and/or an asset used to implement the application, to a location outside the application, and/or an asset used to implement the application, before disabling the application, and/or an asset used to implement the application.

In one embodiment, once at least one responsive action to be associated with each of the one or more trigger events of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303, and to be implemented in response to detection of each of the one or more trigger events of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION OPERATION 303, is defined at DEFINE AT LEAST ONE RESPONSIVE ACTION TO BE ASSOCIATED WITH EACH OF THE ONE OR MORE TRIGGER EVENTS OPERATION 305, process flow proceeds to GENERATE DATA REPRESENTING INSTRUCTIONS FOR MONITORING AND DETECTING THE ONE OR MORE TRIGGER EVENTS IN AN ASSET USED TO IMPLEMENT THE APPLICATION OPERATION 307.

In one embodiment, at GENERATE DATA REPRESENTING INSTRUCTIONS FOR MONITORING AND DETECTING THE ONE OR MORE TRIGGER EVENTS IN AN ASSET USED TO IMPLEMENT THE APPLICATION OPERATION 307 data representing instructions for monitoring and detecting the one or more trigger events in an asset used to implement the application of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACT OPERATION 303 is generated.

In one embodiment, once data representing instructions for monitoring and detecting the one or more trigger events in an asset used to implement the application of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACT OPERATION 303 is generated at GENERATE DATA REPRESENTING INSTRUCTIONS FOR MONITORING AND DETECTING THE ONE OR MORE TRIGGER EVENTS IN AN ASSET USED TO IMPLEMENT THE APPLICATION OPERATION 307, process flow proceeds to GENERATE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS OPERATION 309.

In one embodiment, at GENERATE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS OPERATION 309 data representing instructions for implementing the at least one responsive action associated with each of the one or more trigger events in response to detection of the trigger event of DEFINE AT LEAST ONE RESPONSIVE ACTION TO BE ASSOCIATED WITH EACH OF THE ONE OR MORE TRIGGER EVENTS OPERATION 305 is generated.

In one embodiment, once data representing instructions for implementing the at least one responsive action associated with each of the one or more trigger events in response to detection of the trigger event of DEFINE AT LEAST ONE RESPONSIVE ACTION TO BE ASSOCIATED WITH EACH OF THE ONE OR MORE TRIGGER EVENTS OPERATION 305 is generated at GENERATE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS OPERATION 309, process flow proceeds to PROVIDE AT LEAST PART OF THE DATA REPRESENTING INSTRUCTIONS FOR MONITORING AND DETECTING THE ONE OR MORE TRIGGER EVENTS IN AN ASSET AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 311.

In one embodiment, at PROVIDE AT LEAST PART OF THE DATA REPRESENTING INSTRUCTIONS FOR MONITORING AND DETECTING THE ONE OR MORE TRIGGER EVENTS IN AN ASSET AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 311 at least part of the data representing instructions for monitoring and detecting the one or more trigger events in an asset is provided to at least one asset used to implement the application.

In one embodiment, the data representing instructions for monitoring and detecting the one or more trigger events in an asset used to implement the application of GENERATE DATA REPRESENTING INSTRUCTIONS FOR MONITORING AND DETECTING THE ONE OR MORE TRIGGER EVENTS IN AN ASSET USED TO IMPLEMENT THE APPLICATION OPERATION 307 and the data representing instructions for implementing the at least one responsive action associated with each of the one or more trigger events in response to detection of the trigger event of GENERATE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS OPERATION 309 is provided to the application, and/or one or more assets used to implement the application.

In one embodiment, the data representing instructions for monitoring and detecting the one or more trigger events in an asset used to implement the application of GENERATE DATA REPRESENTING INSTRUCTIONS FOR MONITORING AND DETECTING THE ONE OR MORE TRIGGER EVENTS IN AN ASSET USED TO IMPLEMENT THE APPLICATION OPERATION 307 and the data representing instructions for implementing the at least one responsive action associated with each of the one or more trigger events in response to detection of the trigger event of DEFINE AT LEAST ONE RESPONSIVE ACTION TO BE ASSOCIATED WITH EACH OF THE ONE OR MORE TRIGGER EVENTS OPERATION 305 is provided to the application in the form of a security policy library that is required to be loaded into the application at the time of implementation or startup as part of the application's mandatory configuration. In one embodiment, each application, or application type, is provided a security policy library customized to that particular application and/or application type.

In various embodiments, the security policy library includes, in addition to, and/or as part of, the data representing instructions for monitoring and detecting the one or more trigger events in an asset used to implement the application of GENERATE DATA REPRESENTING INSTRUCTIONS FOR MONITORING AND DETECTING THE ONE OR MORE TRIGGER EVENTS IN AN ASSET USED TO IMPLEMENT THE APPLICATION OPERATION 307 and the data representing instructions for implementing the at least one responsive action associated with each of the one or more trigger events in response to detection of the trigger event of GENERATE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS OPERATION 309, codified security policies, regulatory compliance policies, deployment-dependent policies, run-time specific policies, and/or application-dependent policies.

For example, in one embodiment, the security policy library may have maximum and minimum rates of customer requests that are considered "normal". In one embodiment, the security policy library may include instructions for "auto throttle" implementation if these maximum and minimum rates are exceeded, or not met.

In one embodiment, the security policy library may include instructions for identifying rates of change of customer requests considered normal, or have instructions for implementing policies that inspect the origin of customer requests and decide safe or unsafe origins, or for establishing and monitoring "safe ranges" of rates of requests coming from different areas taking into account environmental parameters such as time of day and location of the service.

In one embodiment, the security policy library may include instructions for identifying and monitoring volumes of failures, or rates of failure, coming from a specific IP address and if the failures, or rates of failure, coming from a specific IP address exceed a threshold level, then blacklisting or blocking all requests from that IP address "at the border" of the application.

In one embodiment, the security policy library may include instructions for using profiles of the responses so that if a collection of responses deviates "from normal" by a given threshold then the application automatically implements a responsive action, or if there is "output of data" per request that deviates from normal, the application automatically implements a responsive action.

In various embodiments, the security policy library is dynamic and can be modified over time to present an open-ended collection of self-inspecting checks, i.e., an open ended set of defined trigger events, and data representing instructions for monitoring and detecting the one or more trigger events in an asset used to implement the application of GENERATE DATA REPRESENTING INSTRUCTIONS FOR MONITORING AND DETECTING THE ONE OR MORE TRIGGER EVENTS IN AN ASSET USED TO IMPLEMENT THE APPLICATION OPERATION 307 can be added or removed.

Likewise, in various embodiments, the security policy library is dynamic and can be modified over time to present an open-ended collection of responsive actions, and data representing instructions for implementing the responsive actions of GENERATE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS OPERATION 309, associated with each of the one or more trigger events, can be added or removed.

In various embodiments, the security policy library, and/or the data representing instructions for monitoring and detecting the one or more trigger events in an asset of GENERATE DATA REPRESENTING INSTRUCTIONS FOR MONITORING AND DETECTING THE ONE OR MORE TRIGGER EVENTS IN AN ASSET USED TO IMPLEMENT THE APPLICATION OPERATION 307 and/or the data representing instructions for implementing the at least one responsive action associated with each of the one or more trigger events of GENERATE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS OPERATION 309 is provided to the application, and/or one or more assets used to implement the application, by the owner of the application, as either a push, or pull, operation.

In various embodiments, the security policy library, and/or the data representing instructions for monitoring and detecting the one or more trigger events in an asset of GENERATE DATA REPRESENTING INSTRUCTIONS FOR MONITORING AND DETECTING THE ONE OR MORE TRIGGER EVENTS IN AN ASSET USED TO IMPLEMENT THE APPLICATION OPERATION 307 and/or the data representing instructions for implementing the at least one responsive action associated with each of the one or more trigger events of GENERATE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS OPERATION 309 is provided to the application, and/or one or more assets used to implement the application, by a provider of at least part of the production environment in which the application is implemented, as either a push, or pull, operation.

In various embodiments, the security policy library, and/or the data representing instructions for monitoring and detecting the one or more trigger events in an asset of GENERATE DATA REPRESENTING INSTRUCTIONS FOR MONITORING AND DETECTING THE ONE OR MORE TRIGGER EVENTS IN AN ASSET USED TO IMPLEMENT THE APPLICATION OPERATION 307 and/or the data representing instructions for implementing the at least one responsive action associated with each of the one or more trigger events of GENERATE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS OPERATION 309 is provided to the application, and/or one or more assets used to implement the application, by a third party service provider, as either a push, or pull, operation.

In one embodiment, at least part of the data representing instructions for monitoring and detecting the one or more trigger events in an asset is provided to at least one asset used to implement the application at PROVIDE AT LEAST PART OF THE DATA REPRESENTING INSTRUCTIONS FOR MONITORING AND DETECTING THE ONE OR MORE TRIGGER EVENTS IN AN ASSET AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 311.

In various embodiments at least part of the data representing instructions for monitoring and detecting the one or more trigger events in an asset is provided to at least one asset used to implement the application at PROVIDE AT LEAST PART OF THE DATA REPRESENTING INSTRUCTIONS FOR MONITORING AND DETECTING THE ONE OR MORE TRIGGER EVENTS IN AN ASSET AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 311 to be used by the at least one asset to monitor for the defined trigger events.

In various embodiments, the at least part of the data representing instructions for monitoring and detecting one or more trigger events is provided to the at least one asset at PROVIDE AT LEAST PART OF THE DATA REPRESENTING INSTRUCTIONS FOR MONITORING AND DETECTING THE ONE OR MORE TRIGGER EVENTS IN AN ASSET AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 311 in a memory or other data store associated with the at least one asset.

In some embodiments, at PROVIDE AT LEAST PART OF THE DATA REPRESENTING INSTRUCTIONS FOR MONITORING AND DETECTING THE ONE OR MORE TRIGGER EVENTS IN AN ASSET AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 311 in addition to at least part of the data representing instructions for monitoring and detecting one or more trigger events of GENERATE DATA REPRESENTING INSTRUCTIONS FOR MONITORING AND DETECTING THE ONE OR MORE TRIGGER EVENTS IN AN ASSET USED TO IMPLEMENT THE APPLICATION OPERATION 307 being provided to the at least one asset, at least part of the data representing instructions for implementing at least one responsive action associated with each of the one or more trigger events of GENERATE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS OPERATION 309 is also transferred to the at least one asset.

In various embodiments, the at least part of the data representing instructions for implementing at least one responsive action associated with each of the one or more trigger events transferred to the at least one asset includes data for simply reporting the detected one or more trigger events, when detected. In various embodiments, the at least part of the data representing instructions for implementing at least one responsive action associated with each of the one or more trigger events transferred to the at least one asset includes data for implementing one or more responsive actions at the asset level in response to the detection of one or more trigger events.

In one embodiment, where the at least one asset is a virtual asset, the at least part of the data representing instructions for monitoring and detecting one or more trigger events is provided to the at least one virtual asset at PROVIDE AT LEAST PART OF THE DATA REPRESENTING INSTRUCTIONS FOR MONITORING AND DETECTING THE ONE OR MORE TRIGGER EVENTS IN AN ASSET AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 311 through a virtual asset creation template used to create, and or instantiate, the at least one virtual asset in a cloud computing environment.

In one embodiment, once at least part of the data representing instructions for monitoring and detecting the one or more trigger events in an asset is provided to at least one asset used to implement the application at PROVIDE AT LEAST PART OF THE DATA REPRESENTING INSTRUCTIONS FOR MONITORING AND DETECTING THE ONE OR MORE TRIGGER EVENTS IN AN ASSET AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 311, process flow proceeds to USE THE AT LEAST PART OF THE DATA REPRESENTING INSTRUCTIONS FOR MONITORING AND DETECTING THE ONE OR MORE TRIGGER EVENTS IN AN ASSET TO DETECT A TRIGGER EVENT INVOLVING THE AT LEAST ONE ASSET OPERATION 313.

In one embodiment, at USE THE AT LEAST PART OF THE DATA REPRESENTING INSTRUCTIONS FOR MONITORING AND DETECTING THE ONE OR MORE TRIGGER EVENTS IN AN ASSET TO DETECT A TRIGGER EVENT INVOLVING THE AT LEAST ONE ASSET OPERATION 313 the at least part of the data representing instructions for monitoring and detecting the one or more trigger events in an asset of PROVIDE AT LEAST PART OF THE DATA REPRESENTING INSTRUCTIONS FOR MONITORING AND DETECTING THE ONE OR MORE TRIGGER EVENTS IN AN ASSET AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 311 is used by the at least one asset to detect a trigger event of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACT OPERATION 303 involving the at least one asset.

In one embodiment, once the at least part of the data representing instructions for monitoring and detecting the one or more trigger events in an asset of PROVIDE AT LEAST PART OF THE DATA REPRESENTING INSTRUCTIONS FOR MONITORING AND DETECTING THE ONE OR MORE TRIGGER EVENTS IN AN ASSET AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 311 is used by the at least one asset to detect a trigger event involving the at least one asset at USE THE AT LEAST PART OF THE DATA REPRESENTING INSTRUCTIONS FOR MONITORING AND DETECTING THE ONE OR MORE TRIG- GER EVENTS IN AN ASSET TO DETECT A TRIGGER EVENT INVOLVING THE AT LEAST ONE ASSET OPERATION 313, process flow proceeds to USE THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AUTOMATICALLY IMPLEMENT THE AT LEAST ONE RESPONSIVE ACTION ASSOCIATED WITH THE DETECTED TRIGGER EVENT OPERATION 315.

In one embodiment, at USE THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AUTOMATICALLY IMPLEMENT THE AT LEAST ONE RESPONSIVE ACTION ASSOCIATED WITH THE DETECTED TRIGGER EVENT OPERATION 315 at least part of the data representing instructions for implementing the at least one responsive action associated with each of the one or more trigger events of GENERATE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS OPERATION 309 is used to automatically implement the at least one responsive action of DEFINE AT LEAST ONE RESPONSIVE ACTION TO BE ASSOCIATED WITH EACH OF THE ONE OR MORE TRIGGER EVENTS OPERATION 305 associated with the detected trigger event of USE THE AT LEAST PART OF THE DATA REPRESENTING INSTRUCTIONS FOR MONITORING AND DETECTING THE ONE OR MORE TRIGGER EVENTS IN AN ASSET TO DETECT A TRIGGER EVENT INVOLVING THE AT LEAST ONE ASSET OPERATION 313.

In one embodiment, once at least part of the data representing instructions for implementing the at least one responsive action associated with each of the one or more trigger events of GENERATE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS OPERATION 309 is used to automatically implement the at least one responsive action of DEFINE AT LEAST ONE RESPONSIVE ACTION TO BE ASSOCIATED WITH EACH OF THE ONE OR MORE TRIGGER EVENTS OPERATION 305 associated with the detected trigger event of USE THE AT LEAST PART OF THE DATA REPRESENTING INSTRUCTIONS FOR MONITORING AND DETECTING THE ONE OR MORE TRIGGER EVENTS IN AN ASSET TO DETECT A TRIGGER EVENT INVOLVING THE AT LEAST ONE ASSET OPERATION 313 at USE THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AUTOMATICALLY IMPLEMENT THE AT LEAST ONE RESPONSIVE ACTION ASSOCIATED WITH THE DETECTED TRIGGER EVENT OPERATION 315, process flow proceeds to EXIT OPERATION 330.

In one embodiment, at EXIT OPERATION 330 process 300 for providing security aware applications is exited to await new data.

Using process 300 for providing security aware applications discussed above, security aware assets are used to implement security aware applications that can self-monitor and self-alarm, or respond, to various security vulnerabilities and breach events.

In accordance with one embodiment, a method and system for providing security aware applications includes defining one or more operational parameters associated with assets used to implement an application. In one embodiment, baseline values for the one or more operational parameters associated with assets used to implement the application are obtained and/or defined. In one embodiment, a trigger deviation value for each of the one or more operational parameters associated with assets used to implement the application are defined.

In one embodiment, one or more trigger events that when detected in an asset used to implement the application require at least one responsive action are defined and include the occurrence of a trigger deviation value for any of the one or more operational parameters associated with assets used to implement the application.

In one embodiment, at least one responsive action to be associated with each of the one or more trigger events is defined. In one embodiment, data representing instructions for monitoring and detecting the one or more trigger events in assets used to implement the application are generated. In one embodiment, data representing instructions for implementing the at least one responsive action associated with each of the one or more trigger events is generated. In one embodiment, at least part of the data representing instructions for monitoring and detecting the one or more trigger events is then provided to at least one asset used to implement the application.

In one embodiment, the at least part of the data representing instructions for monitoring and detecting the one or more trigger events is used by the at least one asset to detect a trigger event involving the at least one asset. In one embodiment, the data representing instructions for implementing the at least one responsive action associated with each of the one or more trigger events is then used to automatically implement the at least one responsive action associated with the detected trigger event.

Figure 4:
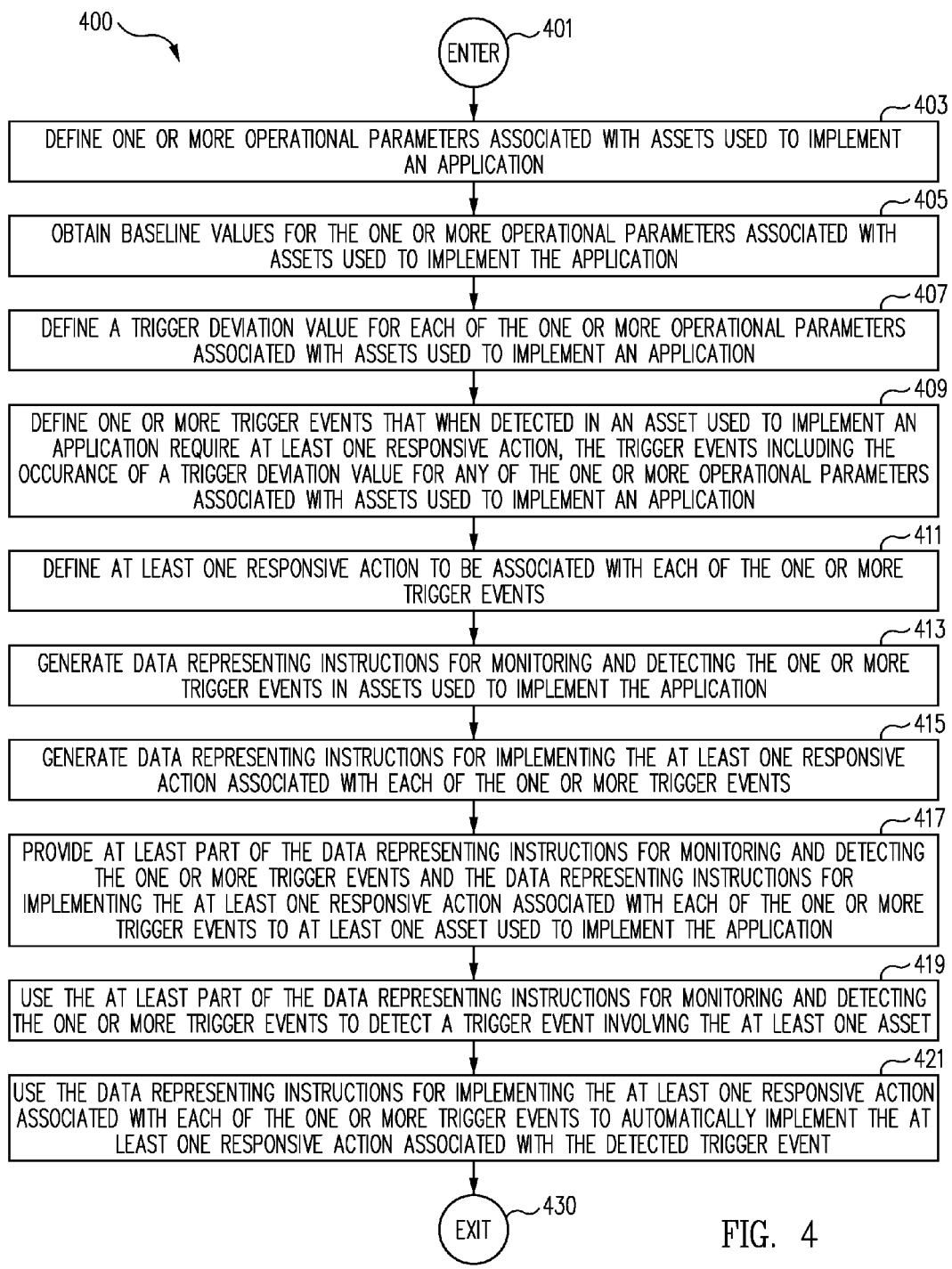
FIG. 4 is a flow chart depicting a process for providing security aware applications in accordance with one embodiment.

FIG. 4 is a flow chart of a process 400 for providing security aware applications in accordance with one embodiment. In one embodiment, process 400 for providing security aware applications begins at ENTER OPERATION 401 of FIG. 4 and process flow proceeds to DEFINE ONE OR MORE OPERATIONAL PARAMETERS ASSOCIATED WITH ASSETS USED TO IMPLEMENT AN APPLICATION OPERATION 403.

In one embodiment, at DEFINE ONE OR MORE OPERATIONAL PARAMETERS ASSOCIATED WITH ASSETS USED TO IMPLEMENT AN APPLICATION OPERATION 403 one or more operational parameters associated with assets used to implement an application in a production environment are defined.

In one embodiment, the one or more operational parameters associated with assets used to implement the application are defined at DEFINE ONE OR MORE OPERATIONAL PARAMETERS ASSOCIATED WITH ASSETS USED TO IMPLEMENT AN APPLICATION OPERATION 403 based on their being parameters that are likely to be affected, or associated with, one or more security vulnerabilities or attacks.

In one embodiment, the defined one or more operational parameters of DEFINE ONE OR MORE OPERATIONAL PARAMETERS ASSOCIATED WITH ASSETS USED TO IMPLEMENT AN APPLICATION OPERATION 403 associated with assets used to implement the application include, but are not limited to, a deployment pattern associated with the application, and/or an asset used to implement the application.

In one embodiment, the defined one or more operational parameters of DEFINE ONE OR MORE OPERATIONAL PARAMETERS ASSOCIATED WITH ASSETS USED TO IMPLEMENT AN APPLICATION OPERATION 403 associated with assets used to implement the application include, but are not limited to, communications channels associated with the application, and/or an asset used to implement the application.

In one embodiment, the defined one or more operational parameters of DEFINE ONE OR MORE OPERATIONAL PARAMETERS ASSOCIATED WITH ASSETS USED TO IMPLEMENT AN APPLICATION OPERATION 403 associated with assets used to implement the application include, but are not limited to, communications channel configurations associated with the application, and/or an asset used to implement the application.

In one embodiment, the defined one or more operational parameters of DEFINE ONE OR MORE OPERATIONAL PARAMETERS ASSOCIATED WITH ASSETS USED TO IMPLEMENT AN APPLICATION OPERATION 403 associated with assets used to implement the application include, but are not limited to, communications traffic patterns associated with the application, and/or an asset used to implement the application.

In one embodiment, the defined one or more operational parameters of DEFINE ONE OR MORE OPERATIONAL PARAMETERS ASSOCIATED WITH ASSETS USED TO IMPLEMENT AN APPLICATION OPERATION 403 associated with assets used to implement the application include, but are not limited to, wireless communications associated with the application, and/or an asset used to implement the application.

In one embodiment, the defined one or more operational parameters of DEFINE ONE OR MORE OPERATIONAL PARAMETERS ASSOCIATED WITH ASSETS USED TO IMPLEMENT AN APPLICATION OPERATION 403 associated with assets used to implement the application include, but are not limited to, periodic events associated with the application, and/or an asset used to implement the application.

In one embodiment, the defined one or more operational parameters of DEFINE ONE OR MORE OPERATIONAL PARAMETERS ASSOCIATED WITH ASSETS USED TO IMPLEMENT AN APPLICATION OPERATION 403 associated with assets used to implement the application include any operational parameter, or combination of operational parameters, as discussed herein, and/or as known in the art at the time of filing, and/or as developed after the time of filing.

In one embodiment, once one or more operational parameters associated with assets used to implement an application in a production environment are defined at DEFINE ONE OR MORE OPERATIONAL PARAMETERS ASSOCIATED WITH ASSETS USED TO IMPLEMENT AN APPLICATION OPERATION 403, process flow proceeds to OBTAIN BASELINE VALUES FOR THE ONE OR MORE OPERATIONAL PARAMETERS ASSOCIATED WITH ASSETS USED TO IMPLEMENT THE APPLICATION OPERATION 405.

In one embodiment, at OBTAIN BASELINE VALUES FOR THE ONE OR MORE OPERATIONAL PARAMETERS ASSOCIATED WITH ASSETS USED TO IMPLEMENT THE APPLICATION OPERATION 405 baseline values for the one or more operational parameters of DEFINE ONE OR MORE OPERATIONAL PARAMETERS ASSOCIATED WITH ASSETS USED TO IMPLEMENT AN APPLICATION OPERATION 403 associated with assets used to implement the application are obtained and/or defined.

In one embodiment, the baseline values for the operational parameters obtained at OBTAIN BASELINE VALUES FOR THE ONE OR MORE OPERATIONAL PARAMETERS ASSOCIATED WITH ASSETS USED TO IMPLEMENT THE APPLICATION OPERATION 405 are based on historical operational data for the application, and/or one or more assets used to implement the application.

In one embodiment, the baseline values for the operational parameters obtained at OBTAIN BASELINE VALUES FOR THE ONE OR MORE OPERATIONAL PARAMETERS ASSOCIATED WITH ASSETS USED TO IMPLEMENT THE APPLICATION OPERATION 405 are based on predicted operational data for the application, and/or one or more assets used to implement the application.

In one embodiment, the baseline values for the operational parameters are obtained at OBTAIN BASELINE VALUES FOR THE ONE OR MORE OPERATIONAL PARAMETERS ASSOCIATED WITH ASSETS USED TO IMPLEMENT THE APPLICATION OPERATION 405 from a third party.

In one embodiment, the baseline values for the one or more operational parameters of OBTAIN BASELINE VALUES FOR THE ONE OR MORE OPERATIONAL PARAMETERS ASSOCIATED WITH ASSETS USED TO IMPLEMENT THE APPLICATION OPERATION 405 include, but are not limited to, a baseline value for a deployment pattern associated with the application, and/or an asset used to implement the application.

In one embodiment, the baseline values for the one or more operational parameters of OBTAIN BASELINE VALUES FOR THE ONE OR MORE OPERATIONAL PARAMETERS ASSOCIATED WITH ASSETS USED TO IMPLEMENT THE APPLICATION OPERATION 405 include, but are not limited to, a baseline value for communications channels associated with the application, and/or an asset used to implement the application.

In one embodiment, the baseline values for the one or more operational parameters of OBTAIN BASELINE VALUES FOR THE ONE OR MORE OPERATIONAL PARAMETERS ASSOCIATED WITH ASSETS USED TO IMPLEMENT THE APPLICATION OPERATION 405 include, but are not limited to, a baseline value for communications channel configurations associated with the application, and/or an asset used to implement the application.

In one embodiment, the baseline values for the one or more operational parameters of OBTAIN BASELINE VALUES FOR THE ONE OR MORE OPERATIONAL PARAMETERS ASSOCIATED WITH ASSETS USED TO IMPLEMENT THE APPLICATION OPERATION 405 include, but are not limited to, a baseline value for communications traffic patterns associated with the application, and/or an asset used to implement the application.

In one embodiment, the baseline values for the one or more operational parameters of OBTAIN BASELINE VALUES FOR THE ONE OR MORE OPERATIONAL PARAMETERS ASSOCIATED WITH ASSETS USED TO IMPLEMENT THE APPLICATION OPERATION 405 include, but are not limited to, a baseline value for wireless communications associated with the application, and/or an asset used to implement the application.

In one embodiment, the baseline values for the one or more operational parameters of OBTAIN BASELINE VALUES FOR THE ONE OR MORE OPERATIONAL PARAMETERS ASSOCIATED WITH ASSETS USED TO IMPLE- MENT THE APPLICATION OPERATION 405 include, but are not limited to, a baseline value for a periodic event associated with the application, and/or an asset used to implement the application.

In one embodiment, the baseline values for the one or more operational parameters of OBTAIN BASELINE VALUES FOR THE ONE OR MORE OPERATIONAL PARAMETERS ASSOCIATED WITH ASSETS USED TO IMPLEMENT THE APPLICATION OPERATION 405 include baseline values for any operational parameters, or combination of operational parameters, as discussed herein, and/or as known in the art at the time of filing, and/or as developed after the time of filing.

In one embodiment, once baseline values for the one or more operational parameters of DEFINE ONE OR MORE OPERATIONAL PARAMETERS ASSOCIATED WITH ASSETS USED TO IMPLEMENT AN APPLICATION OPERATION 403 associated with assets used to implement the application are obtained and/or defined at OBTAIN BASELINE VALUES FOR THE ONE OR MORE OPERATIONAL PARAMETERS ASSOCIATED WITH ASSETS USED TO IMPLEMENT THE APPLICATION OPERATION 405, process flow proceeds to DEFINE A TRIGGER DEVIATION VALUE FOR EACH OF THE ONE OR MORE OPERATIONAL PARAMETERS ASSOCIATED WITH ASSETS USED TO IMPLEMENT AN APPLICATION OPERATION 407.

In one embodiment, at DEFINE A TRIGGER DEVIATION VALUE FOR EACH OF THE ONE OR MORE OPERATIONAL PARAMETERS ASSOCIATED WITH ASSETS USED TO IMPLEMENT AN APPLICATION OPERATION 407 a trigger deviation value for each of the one or more operational parameters of DEFINE ONE OR MORE OPERATIONAL PARAMETERS ASSOCIATED WITH ASSETS USED TO IMPLEMENT AN APPLICATION OPERATION 403 associated with assets used to implement the application are defined.

In one embodiment, once a trigger deviation value for each of the one or more operational parameters of DEFINE ONE OR MORE OPERATIONAL PARAMETERS ASSOCIATED WITH ASSETS USED TO IMPLEMENT AN APPLICATION OPERATION 403 associated with assets used to implement the application are defined at DEFINE A TRIGGER DEVIATION VALUE FOR EACH OF THE ONE OR MORE OPERATIONAL PARAMETERS ASSOCIATED WITH ASSETS USED TO IMPLEMENT AN APPLICATION OPERATION 407, process flow proceeds to DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409.

In one embodiment, at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 one or more trigger events associated with the application, and/or one or more assets used to implement the application, are defined and include the occurrence of a trigger deviation value for any of the one or more operational parameters associated with assets used to implement the application.

In one embodiment, the one or more trigger events of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 are events that when detected in an application, and/or an asset used to implement an application, represent a potential security vulnerability and require at least one responsive action.

As noted above, in one embodiment, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 include, but are not limited to, the occurrence of a trigger deviation value for any of the one or more operational parameters associated with assets used to implement the application.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 include, but are not limited to, a change in software associated with the application, and/or an asset used to implement the application, such as a change in the software stack used by the application, and/or one or more assets used to implement the application.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 include, but are not limited to, the receipt of one or more defined commands by the application, and/or an asset used to implement the application, such as a load library or transfer or copy buffer command.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 include, but are not limited to, a change in a deployment pattern associated with the application, and/or an asset used to implement the application. For instance, in one embodiment, an asset being deployed in a different location, or used for a different purpose.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 include, but are not limited to, a change in a communications channel associated with the application, and/or an asset used to implement the application.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 include, but are not limited to, a change in communications associated with the application, and/or an asset used to implement the application. For instance, in one embodiment, an increase or decrease in traffic during normal or non-business hours for an origin or destination location.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 include, but are not limited to, a deviation from an expected communications traffic pattern associated with the application, and/or an asset used to implement the application, For instance, in one embodiment, an increase or decrease in traffic from an origin or destination location.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 include, but are not limited to, a geo-location of the recipient of communications traffic associated with the application, and/or an asset used to implement the application, such as communication traffic to a destination geo-location known to be suspicious and/or associated with malicious parties.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 include, but are not limited to, a geo-location of the originator of communications traffic associated with the application, and/or an asset used to implement the application, such as communication traffic from an origin geo-location known to be suspicious and/or associated with malicious parties.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 include, but are not limited to, a change in a pattern of wireless communications associated with the application, and/or an asset used to implement the application.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 include, but are not limited to, a change in a phone number associated with communications associated with the application, and/or an asset used to implement the application.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 include, but are not limited to, a change in a user ID associated with a user of the application, and/or an asset used to implement the application.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 include, but are not limited to, a change in the profile of a user associated with the application, and/or an asset used to implement the application.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 include, but are not limited to, a change in a periodic event associated with the application, and/or an asset used to implement the application, such as a change in the time, frequency, or day of a periodic backup associated with the application, and/or an asset used to implement the application, or a change in the time, frequency, or day of periodic maintenance or updates associated with the application, and/or an asset used to implement the application.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 include, but are not limited to, a deviation from any defined expected normal operations parameter associated with the application, and/or an asset used to implement the application.

In various embodiments, the one or more trigger events defined at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 include any trigger events, or combination of trigger events, as discussed herein, and/or as known in the art at the time of filing, and/or as developed after the time of filing.

In one embodiment, once one or more trigger events associated with the application, and/or one or more assets used to implement the application, are defined and include the occurrence of a trigger deviation value for any of the one or more operational parameters associated with assets used to implement the application at DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409, process flow proceeds to DEFINE AT LEAST ONE RESPONSIVE ACTION TO BE ASSOCIATED WITH EACH OF THE ONE OR MORE TRIGGER EVENTS OPERATION 411.

In one embodiment, at DEFINE AT LEAST ONE RESPONSIVE ACTION TO BE ASSOCIATED WITH EACH OF THE ONE OR MORE TRIGGER EVENTS OPERATION 411 at least one responsive action to be associated with each of the one or more trigger events, and to be implemented in response to detection of each of the one or more trigger events, is defined.

In various embodiments, the responsive actions to be associated with each of the one or more trigger events of DEFINE AT LEAST ONE RESPONSIVE ACTION TO BE ASSOCIATED WITH EACH OF THE ONE OR MORE TRIGGER EVENTS OPERATION 411 are dependent on the associated trigger events and the level of risk associated with the trigger events.

In various embodiments, the responsive actions to be associated with each of the one or more trigger events of DEFINE AT LEAST ONE RESPONSIVE ACTION TO BE ASSOCIATED WITH EACH OF THE ONE OR MORE TRIGGER EVENTS OPERATION 411 include, but are not limited to, notifying a party or entity of the detected trigger event.

In various embodiments, the responsive actions to be associated with each of the one or more trigger events of DEFINE AT LEAST ONE RESPONSIVE ACTION TO BE ASSOCIATED WITH EACH OF THE ONE OR MORE TRIGGER EVENTS OPERATION 411 include, but are not limited to, disabling one or more operations performed by the application, and/or an asset used to implement the application, until one or more required actions have taken place, such as an acknowledgement of the notification of the trigger event, and instructions to ignore, or act upon, the trigger event are received.

In various embodiments, the responsive actions to be associated with each of the one or more trigger events of DEFINE AT LEAST ONE RESPONSIVE ACTION TO BE ASSOCIATED WITH EACH OF THE ONE OR MORE TRIGGER EVENTS OPERATION 411 include, but are not limited to, permanently disabling one or more operations performed by the application, and/or an asset used to implement the application.

In various embodiments, the responsive actions to be associated with each of the one or more trigger events of DEFINE AT LEAST ONE RESPONSIVE ACTION TO BE ASSOCIATED WITH EACH OF THE ONE OR MORE TRIGGER EVENTS OPERATION 411 include, but are not limited to, disabling one or more communications channels associated with the application, and/or an asset used to implement the application, until one or more required actions have taken place, such as an acknowledgement of the notification of the trigger event, and instructions to ignore, or act upon, the trigger event are received.

In various embodiments, the responsive actions to be associated with each of the one or more trigger events of DEFINE AT LEAST ONE RESPONSIVE ACTION TO BE ASSOCIATED WITH EACH OF THE ONE OR MORE TRIGGER EVENTS OPERATION 411 include, but are not limited to, permanently disabling one or more communications channels associated with the application, and/or an asset used to implement the application.

In various embodiments, the responsive actions to be associated with each of the one or more trigger events of DEFINE AT LEAST ONE RESPONSIVE ACTION TO BE ASSOCIATED WITH EACH OF THE ONE OR MORE TRIGGER EVENTS OPERATION 411 include, but are not limited to, blocking a portion of communications traffic associated with the application, and/or an asset used to implement the application, until one or more required actions have taken place, such as an acknowledgement of the notification of the trigger event, and instructions to ignore, or act upon, the trigger event are received.

In various embodiments, the responsive actions to be associated with each of the one or more trigger events of DEFINE AT LEAST ONE RESPONSIVE ACTION TO BE ASSOCIATED WITH EACH OF THE ONE OR MORE TRIGGER EVENTS OPERATION 411 include, but are not limited to, permanently blocking a portion of communications traffic associated with the application, and/or an asset used to implement the application.

In various embodiments, the responsive actions to be associated with each of the one or more trigger events of DEFINE AT LEAST ONE RESPONSIVE ACTION TO BE ASSOCIATED WITH EACH OF THE ONE OR MORE TRIGGER EVENTS OPERATION 411 include, but are not limited to, disabling the application, and/or an asset used to implement the application, until one or more required actions have taken place, such as an acknowledgement of the notification of the trigger event, and instructions to ignore, or act upon, the trigger event are received.

In various embodiments, the responsive actions to be associated with each of the one or more trigger events of DEFINE AT LEAST ONE RESPONSIVE ACTION TO BE ASSOCIATED WITH EACH OF THE ONE OR MORE TRIGGER EVENTS OPERATION 411 include, but are not limited to, permanently disabling the application, and/or an asset used to implement the application, until one or more required actions have taken place.

In various embodiments, the responsive actions to be associated with each of the one or more trigger events of DEFINE AT LEAST ONE RESPONSIVE ACTION TO BE ASSOCIATED WITH EACH OF THE ONE OR MORE TRIGGER EVENTS OPERATION 411 include, but are not limited to, obtaining data from the application, and/or an asset used to implement the application, before disabling the application, and/or an asset used to implement the application.

In various embodiments, the responsive actions to be associated with each of the one or more trigger events of DEFINE AT LEAST ONE RESPONSIVE ACTION TO BE ASSOCIATED WITH EACH OF THE ONE OR MORE TRIGGER EVENTS OPERATION 411 include, but are not limited to, directing a transfer of data from the application, and/or an asset used to implement the application, to a location outside the application, and/or an asset used to implement the application, before disabling the application, and/or an asset used to implement the application.

In one embodiment, once at least one responsive action to be associated with each of the one or more trigger events, and to be implemented in response to detection of each of the one or more trigger events, is defined at DEFINE AT LEAST ONE RESPONSIVE ACTION TO BE ASSOCIATED WITH EACH OF THE ONE OR MORE TRIGGER EVENTS OPERATION 411, process flow proceeds to GENERATE DATA REPRESENTING INSTRUCTIONS FOR MONITORING AND DETECTING THE ONE OR MORE TRIGGER EVENTS IN ASSETS USED TO IMPLEMENT THE APPLICATION OPERATION 413.

In one embodiment, at GENERATE DATA REPRESENTING INSTRUCTIONS FOR MONITORING AND DETECTING THE ONE OR MORE TRIGGER EVENTS IN ASSETS USED TO IMPLEMENT THE APPLICATION OPERATION 413 data representing instructions for monitoring and detecting the one or more trigger events in an asset used to implement the application of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 is generated.

In one embodiment, once data representing instructions for monitoring and detecting the one or more trigger events in an asset used to implement the application of DEFINE ONE OR MORE TRIGGER EVENTS THAT WHEN DETECTED IN AN ASSET USED TO IMPLEMENT AN APPLICATION REQUIRE AT LEAST ONE RESPONSIVE ACTION, THE TRIGGER EVENTS INCLUDING THE OCCURRENCE OF A TRIGGER DEVIATION VALUE FOR ANY OF THE ONE OR MORE OPERATIONAL PARAMETERS ASSOCIATED WITH ASSETS USED TO IMPLEMENT AN APPLICATION OPERATION 409 is generated at GENERATE DATA REPRESENTING INSTRUCTIONS FOR MONITORING AND DETECTING THE ONE OR MORE TRIGGER EVENTS IN ASSETS USED TO IMPLEMENT THE APPLICATION OPERATION 413, process flow proceeds to GENERATE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS OPERATION 415.

In one embodiment, at GENERATE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS OPERATION 415 data representing instructions for implementing the at least one responsive action associated with each of the one or more trigger events in response to detection of the trigger event of DEFINE AT LEAST ONE RESPONSIVE ACTION TO BE ASSOCIATED WITH EACH OF THE ONE OR MORE TRIGGER EVENTS OPERATION 411 is generated.

In one embodiment, once data representing instructions for implementing the at least one responsive action associated with each of the one or more trigger events in response to detection of the trigger event of DEFINE AT LEAST ONE RESPONSIVE ACTION TO BE ASSOCIATED WITH EACH OF THE ONE OR MORE TRIGGER EVENTS OPERATION 411 is generated at GENERATE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS OPERATION 415, process flow proceeds to PROVIDE AT LEAST PART OF THE DATA REPRESENTING INSTRUCTIONS FOR MONITORING AND DETECTING THE ONE OR MORE TRIGGER EVENTS AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 417.

In one embodiment, the data representing instructions for monitoring and detecting the one or more trigger events in an asset used to implement the application and the data representing instructions for implementing the at least one responsive action associated with each of the one or more trigger events in response to detection of the trigger event is provided to the application, and/or one or more assets used to implement the application.

In one embodiment, the data representing instructions for monitoring and detecting the one or more trigger events in an asset used to implement the application and the data representing instructions for implementing the at least one responsive action associated with each of the one or more trigger events in response to detection of the trigger event is provided to the application in the form of a security policy library that is required to be loaded into the application at the time of implementation or startup as part of the application's mandatory configuration. In one embodiment, each application, or application type, is provided a security policy library customized to that particular application and/or application type.

In various embodiments, the security policy library includes, in addition to, and/or as part of, the data representing instructions for monitoring and detecting the one or more trigger events in an asset used to implement the application and the data representing instructions for implementing the at least one responsive action associated with each of the one or more trigger events in response to detection of the trigger event, codified security policies, regulatory compliance policies, deployment-dependent policies, run-time specific policies, and/or application-dependent policies.

For example, in one embodiment, the security policy library may have maximum and minimum rates of customer requests that are considered "normal". In one embodiment, the security policy library may include instructions for "auto throttle" implementation if these maximum and minimum rates are exceeded, or not met.

In one embodiment, the security policy library may include instructions for identifying rates of change of customer requests considered normal, or have instructions for implementing policies that inspect the origin of customer requests and decide safe or unsafe origins, or for establishing and monitoring "safe ranges" of rates of requests coming from different areas taking into account environmental parameters such as time of day and location of the service.

In one embodiment, the security policy library may include instructions for identifying and monitoring volumes of failures, or rates of failure, coming from a specific IP address and if the failures, or rates of failure, coming from a specific IP address exceed a threshold level, then blacklisting or blocking all requests from that IP address "at the border" of the application.

In one embodiment, the security policy library may include instructions for using profiles of the responses so that if a collection of responses deviates "from normal" by a given threshold then the application automatically implements a responsive action, or if there is "output of data" per request that deviates from normal, the application automatically implements a responsive action.

In various embodiments, the security policy library is dynamic and can be modified over time to present an open-ended collection of self-inspecting checks, i.e., an open ended set of defined trigger events, and data representing instructions for monitoring and detecting the one or more trigger events in an asset used to implement the application. Likewise, in various embodiments, the security policy library is dynamic and can be modified over time to present an open-ended collection of responsive actions, and data representing instructions for implementing the responsive actions, associated with each of the one or more trigger events.

In various embodiments, the security policy library, and/or the data representing instructions for monitoring and detecting the one or more trigger events in an asset, and/or the data representing instructions for implementing the at least one responsive action associated with each of the one or more trigger events, is provided to the application, and/or one or more assets used to implement the application, by the owner of the application, as either a push, or pull, operation.

In various embodiments, the security policy library, and/or the data representing instructions for monitoring and detecting the one or more trigger events in an asset, and/or the data representing instructions for implementing the at least one responsive action associated with each of the one or more trigger events, is provided to the application, and/or one or more assets used to implement the application, by a provider of at least part of the production environment in which the application is implemented, as either a push, or pull, operation.

In various embodiments, the security policy library, and/or the data representing instructions for monitoring and detecting the one or more trigger events in an asset, and/or the data representing instructions for implementing the at least one responsive action associated with each of the one or more trigger events, is provided to the application, and/or one or more assets used to implement the application, by a third party service provider, as either a push, or pull, operation.

In one embodiment, at PROVIDE AT LEAST PART OF THE DATA REPRESENTING INSTRUCTIONS FOR MONITORING AND DETECTING THE ONE OR MORE TRIGGER EVENTS AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 417 at least part of the data representing instructions for monitoring and detecting the one or more trigger events in an asset of PROVIDE AT LEAST PART OF THE DATA REPRESENTING INSTRUCTIONS FOR MONITORING AND DETECTING THE ONE OR MORE TRIGGER EVENTS AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 417 is provided to at least one asset used to implement the application.

In various embodiments, at PROVIDE AT LEAST PART OF THE DATA REPRESENTING INSTRUCTIONS FOR MONITORING AND DETECTING THE ONE OR MORE TRIGGER EVENTS AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 417 at least part of the data representing instructions for monitoring and detecting the one or more trigger events in an asset is provided to at least one asset used to implement the application to be used by the at least one asset to monitor for the defined trigger events.

In various embodiments, at PROVIDE AT LEAST PART OF THE DATA REPRESENTING INSTRUCTIONS FOR MONITORING AND DETECTING THE ONE OR MORE TRIGGER EVENTS AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 417 the at least part of the data representing instructions for monitoring and detecting one or more trigger events is provided to the at least one asset in a memory or other data store associated with the at least one asset.

In some embodiments, in addition to at least part of the data representing instructions for monitoring and detecting one or more trigger events being provided to the at least one asset, at PROVIDE AT LEAST PART OF THE DATA REPRESENTING INSTRUCTIONS FOR MONITORING AND DETECTING THE ONE OR MORE TRIGGER EVENTS AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 417 at least part of the data representing instructions for implementing at least one responsive action associated with each of the one or more trigger events is also transferred to the at least one asset.

In various embodiments, the at least part of the data representing instructions for implementing at least one responsive action associated with each of the one or more trigger events transferred to the at least one asset includes data for simply reporting the detected one or more trigger events, when detected. In various embodiments, the at least part of the data representing instructions for implementing at least one responsive action associated with each of the one or more trigger events transferred to the at least one asset includes data for implementing one or more responsive actions at the asset level in response to the detection of one or more trigger events.

In one embodiment, where the at least one asset is a virtual asset, the at least part of the data representing instructions for monitoring and detecting one or more trigger events is provided to the at least one virtual asset at PROVIDE AT LEAST PART OF THE DATA REPRESENTING INSTRUCTIONS FOR MONITORING AND DETECTING THE ONE OR MORE TRIGGER EVENTS AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 417 through a virtual asset creation template used to create, and or instantiate, the at least one virtual asset in a cloud computing environment.

In one embodiment, once at least part of the data representing instructions for monitoring and detecting the one or more trigger events in an asset of PROVIDE AT LEAST PART OF THE DATA REPRESENTING INSTRUCTIONS FOR MONITORING AND DETECTING THE ONE OR MORE TRIGGER EVENTS AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 417 is provided to at least one asset used to implement the application at PROVIDE AT LEAST PART OF THE DATA REPRESENTING INSTRUCTIONS FOR MONITORING AND DETECTING THE ONE OR MORE TRIGGER EVENTS AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 417, process flow proceeds to USE THE AT LEAST PART OF THE DATA REPRESENTING INSTRUCTIONS FOR MONITORING AND DETECTING THE ONE OR MORE TRIGGER EVENTS TO DETECT A TRIGGER EVENT INVOLVING THE AT LEAST ONE ASSET OPERATION 419.

In one embodiment, at USE THE AT LEAST PART OF THE DATA REPRESENTING INSTRUCTIONS FOR MONITORING AND DETECTING THE ONE OR MORE TRIGGER EVENTS TO DETECT A TRIGGER EVENT INVOLVING THE AT LEAST ONE ASSET OPERATION 419 the at least part of the data representing instructions for monitoring and detecting the one or more trigger events in an asset of PROVIDE AT LEAST PART OF THE DATA REPRESENTING INSTRUCTIONS FOR MONITORING AND DETECTING THE ONE OR MORE TRIGGER EVENTS AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 417 is used by the at least one asset to detect a trigger event involving the at least one asset.

In one embodiment, once the at least part of the data representing instructions for monitoring and detecting the one or more trigger events in an asset of PROVIDE AT LEAST PART OF THE DATA REPRESENTING INSTRUCTIONS FOR MONITORING AND DETECTING THE ONE OR MORE TRIGGER EVENTS AND THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AT LEAST ONE ASSET USED TO IMPLEMENT THE APPLICATION OPERATION 417 is used by the at least one asset to detect a trigger event involving the at least one asset at USE THE AT LEAST PART OF THE DATA REPRESENTING INSTRUCTIONS FOR MONITORING AND DETECTING THE ONE OR MORE TRIGGER EVENTS TO DETECT A TRIGGER EVENT INVOLVING THE AT LEAST ONE ASSET OPERATION 419, process flow proceeds to USE THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AUTOMATICALLY IMPLEMENT THE AT LEAST ONE RESPONSIVE ACTION ASSOCIATED WITH THE DETECTED TRIGGER EVENT OPERATION 421.

In one embodiment, at USE THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AUTOMATICALLY IMPLEMENT THE AT LEAST ONE RESPONSIVE ACTION ASSOCIATED WITH THE DETECTED TRIGGER EVENT OPERATION 421 at least part of the data representing instructions for implementing the at least one responsive action associated with each of the one or more trigger events of GENERATE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS OPERATION 415 is used to automatically implement the at least one responsive action associated with the detected trigger event of USE THE AT LEAST PART OF THE DATA REPRESENTING INSTRUCTIONS FOR MONITORING AND DETECTING THE ONE OR MORE TRIGGER EVENTS TO DETECT A TRIGGER EVENT INVOLVING THE AT LEAST ONE ASSET OPERATION 419.

In one embodiment, once at least part of the data representing instructions for implementing the at least one responsive action associated with each of the one or more trigger events of GENERATE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS OPERATION 415 is used to automatically implement the at least one responsive action associated with the detected trigger event of USE THE AT LEAST PART OF THE DATA REPRESENTING INSTRUCTIONS FOR MONITORING AND DETECTING THE ONE OR MORE TRIGGER EVENTS TO DETECT A TRIGGER EVENT INVOLVING THE AT LEAST ONE ASSET OPERATION 419 at USE THE DATA REPRESENTING INSTRUCTIONS FOR IMPLEMENTING THE AT LEAST ONE RESPONSIVE ACTION ASSOCIATED WITH EACH OF THE ONE OR MORE TRIGGER EVENTS TO AUTOMATICALLY IMPLEMENT THE AT LEAST ONE RESPONSIVE ACTION ASSOCIATED WITH THE DETECTED TRIGGER EVENT OPERATION 421, process flow proceeds to EXIT OPERATION 430.

In one embodiment, at EXIT OPERATION 430 process 400 for providing security aware applications is exited to await new data.

Using process 400 for providing security aware applications, baseline operational data and security aware assets are used to implement security aware applications that can self-monitor and self-alarm, or respond, to various security vulnerabilities and breach events.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for providing security aware applications comprising:
   at least one processor; and
   at least one memory coupled to the at least one processor, the at least one memory having stored therein instructions which when executed by any set of the one or more processors, perform a process for providing security aware applications, the process for providing security aware applications including:

defining one or more trigger events that when detected in an asset used to implement an application require at least one responsive action;

defining at least one responsive action to be associated with each of the one or more trigger events, wherein one of the one or more defined responsive actions includes notifying a party or entity of the detected trigger event;

generating data representing instructions for monitoring and detecting the one or more trigger events in an asset used to implement the application;

generating data representing instructions for implementing the at least one responsive action associated with each of the one or more trigger events;

providing at least part of the data representing instructions for monitoring and detecting the one or more trigger events in an asset to at least one asset used to implement the application;

using the at least part of the data representing instructions for monitoring and detecting the one or more trigger events in an asset to detect a trigger event involving the at least one asset; and using the data representing instructions for implementing the at least one responsive action associated with each of the one or more trigger events to automatically implement the at least one responsive action associated with the detected trigger event.

2. The system for providing security aware applications of claim 1 wherein at least one of the defined trigger events is selected from the group of trigger events consisting of:
- a change in software associated with the application, and/or an asset used to implement the application;
- a change in a software stack associated with the application, and/or an asset used to implement the application;
- the receipt of one or more defined commands by the application, and/or an asset used to implement the application;
- a change in a deployment pattern associated with the application, and/or an asset used to implement the application;
- a change in a communications channel associated with the application, and/or an asset used to implement the application;
- a change in a communications channel configuration associated with the application, and/or an asset used to implement the application;
- a deviation from an expected communications traffic pattern associated with the application, and/or an asset used to implement the application;
- a geo-location of the recipient of communications traffic associated with the application, and/or an asset used to implement the application;
- a geo-location of the originator of communications traffic associated with the application, and/or an asset used to implement the application;
- a change in a pattern of wireless communications associated with the application, and/or an asset used to implement the application;
- a change in a phone number associated with communications associated with the application, and/or an asset used to implement the application;
- a change in a user ID associated with a user of the application, and/or an asset used to implement the application;
- a change in the profile of a user associated with the application, and/or an asset used to implement the application;
- a change in a periodic event associated with the application, and/or an asset used to implement the application; and
- a deviation from any defined expected normal operations parameter associated with the application, and/or an asset used to implement the application.

3. The system for providing security aware applications of claim 1 wherein at least one of the defined responsive actions is selected from the group of responsive actions consisting of:
- disabling one or more operations performed by the application, and/or an asset used to implement the application, until one or more required actions have taken place;
- permanently disabling one or more operations performed by the application, and/or an asset used to implement the application;
- disabling one or more communications channels associated with the application, and/or an asset used to implement the application, until one or more required actions have taken place;
- permanently disabling one or more communications channels associated with the application, and/or an asset used to implement the application;
- blocking a portion of communications traffic associated with the application, and/or an asset used to implement the application, until one or more required actions have taken place;
- permanently blocking a portion of communications traffic associated with the application, and/or an asset used to implement the application;
- disabling the application, and/or an asset used to implement the application, until one or more required actions have taken place;
- permanently disabling the application, and/or an asset used to implement the application, until one or more required actions have taken place; and
- directing a transfer of data from the application, and/or an asset used to implement the application, to a location outside the application, and/or an asset used to implement the application, before disabling the application, and/or an asset used to implement the application.

4. The system for providing security aware applications of claim 1 wherein the at least one asset used to implement the application is a virtual asset selected from the group of the virtual assets consisting of:
- a virtual machine;
- a virtual server;
- a database or data store;
- an instance in a cloud environment;
- a cloud environment access system;
- part of a mobile device;
- part of a remote sensor;
- part of a server computing system; and
- part of a desktop computing system.

5. The system for providing security aware applications of claim 1 wherein the data representing instructions for monitoring and detecting the one or more trigger events in an asset and the data representing instructions for implementing the at least one responsive action associated with each of the one or more trigger events is provided by providing a security policy library to the application, and/or one or more assets used to implement the application.

6. The system for providing security aware applications of claim 1 wherein the data representing instructions for monitoring and detecting the one or more trigger events in an asset and the data representing instructions for implementing the at least one responsive action associated with each of the one or more trigger events is provided through a virtual asset creation template used to instantiate the at least one virtual asset used to implement the application.

7. The system for providing security aware applications of claim 1 wherein the data representing instructions for monitoring and detecting the one or more trigger events in an asset and the data representing instructions for implementing the at least one responsive action associated with each of the one or more trigger events is provided to the application, and/or one or more assets used to implement the application, by the owner of the application.

8. The system for providing security aware applications of claim 1 wherein the data representing instructions for monitoring and detecting the one or more trigger events in an asset and the data representing instructions for implementing the at least one responsive action associated with each of the one or more trigger events is provided by a provider of at least part of a production environment in which the application is implemented.

9. The system for providing security aware applications of claim 1 wherein the data representing instructions for monitoring and detecting the one or more trigger events in an asset and the data representing instructions for implementing the at least one responsive action associated with each of the one or more trigger events is provided by a third party service provider.

10. A system for providing security aware applications comprising:
    an application;
    a production environment for implementing the application;
    one or more assets used to implement the application in the production environment;
    data for monitoring and detecting one or more trigger events in one of more of the assets used to implement the application in the production environment;
    data representing instructions for implementing at least one responsive action associated with each of the one or more trigger events upon detection of the one or more trigger events in one of more of the assets used to implement the application in the production environment, wherein at least one responsive action associated with at least one trigger event includes notifying a party or entity of the detected trigger event;
    at least one processor; and
    at least one memory coupled to the at least one processor, the at least one memory having stored therein instructions which when executed by any set of the one or more processors, perform a process for providing security aware applications, the process for providing security aware applications including:
    providing at least part of the data for monitoring and detecting the one or more trigger events to at least one asset used to implement the application in the production environment;
    using the at least part of the data for monitoring and detecting the one or more trigger events to detect a trigger event involving the at least one asset; and
    using the data representing instructions for implementing the at least one responsive action associated with each of the one or more trigger events to automatically implement the at least one responsive action associated with the detected trigger event.

11. The system for providing security aware applications of claim 10 wherein at least one of the defined trigger events is selected from the group of trigger events consisting of:
    a change in software associated with the application, and/or an asset used to implement the application;
    a change in a software stack associated with the application, and/or an asset used to implement the application;
    the receipt of one or more defined commands by the application, and/or an asset used to implement the application;
    a change in a deployment pattern associated with the application, and/or an asset used to implement the application;
    a change in a communications channel associated with the application, and/or an asset used to implement the application;
    a change in a communications channel configuration associated with the application, and/or an asset used to implement the application;
    a deviation from an expected communications traffic pattern associated with the application, and/or an asset used to implement the application;
    a geo-location of the recipient of communications traffic associated with the application, and/or an asset used to implement the application;
    a geo-location of the originator of communications traffic associated with the application, and/or an asset used to implement the application;
    a change in a pattern of wireless communications associated with the application, and/or an asset used to implement the application;
    a change in a phone number associated with communications associated with the application, and/or an asset used to implement the application;
    a change in a user ID associated with a user of the application, and/or an asset used to implement the application;
    a change in the profile of a user associated with the application, and/or an asset used to implement the application;
    a change in a periodic event associated with the application, and/or an asset used to implement the application; and
    a deviation from any defined expected normal operations parameter associated with the application, and/or an asset used to implement the application.

12. The system for providing security aware applications of claim 10 wherein at least one of the defined responsive actions is selected from the group of responsive actions consisting of:
    disabling one or more operations performed by the application, and/or an asset used to implement the application, until one or more required actions have taken place;
    permanently disabling one or more operations performed by the application, and/or an asset used to implement the application;
    disabling one or more communications channels associated with the application, and/or an asset used to implement the application, until one or more required actions have taken place;
    permanently disabling one or more communications channels associated with the application, and/or an asset used to implement the application;
    blocking a portion of communications traffic associated with the application, and/or an asset used to implement the application, until one or more required actions have taken place;
    permanently blocking a portion of communications traffic associated with the application, and/or an asset used to implement the application;

disabling the application, and/or an asset used to implement the application, until one or more required actions have taken place;

permanently disabling the application, and/or an asset used to implement the application, until one or more required actions have taken place; and directing a transfer of data from the application, and/or an asset used to implement the application, to a location outside the application, and/or an asset used to implement the application, before disabling the application, and/or an asset used to implement the application.

13. The system for providing security aware applications of claim 10 wherein the at least one asset used to implement the application in the production environment is a virtual asset selected from the group of the virtual assets consisting of:
a virtual machine;
a virtual server;
a database or data store;
an instance in a cloud environment;
a cloud environment access system;
part of a mobile device;
part of a remote sensor;
part of a server computing system; and
part of a desktop computing system.

14. The system for providing security aware applications of claim 10 wherein the data for monitoring and detecting the one or more trigger events and the data representing instructions for implementing the at least one responsive action associated with each of the one or more trigger events is provided by providing a security policy library to the application, and/or one or more assets used to implement the application.

15. The system for providing security aware applications of claim 10 wherein the data for monitoring and detecting the one or more trigger events and the data representing instructions for implementing the at least one responsive action associated with each of the one or more trigger events is provided through a virtual asset creation template used to instantiate the at least one virtual asset used to implement the application in the production environment.

16. The system for providing security aware applications of claim 10 wherein the data representing instructions for monitoring and detecting the one or more trigger events in an asset and the data representing instructions for implementing the at least one responsive action associated with each of the one or more trigger events is provided by the owner of the application.

17. The system for providing security aware applications of claim 10 wherein the data representing instructions for monitoring and detecting the one or more trigger events in an asset and the data representing instructions for implementing the at least one responsive action associated with each of the one or more trigger events is provided by a provider of at least part of the production environment in which the application is implemented.

18. The system for providing security aware applications of claim 10 wherein the data representing instructions for monitoring and detecting the one or more trigger events in an asset and the data representing instructions for implementing the at least one responsive action associated with each of the one or more trigger events is provided by a third party service provider.

19. A system for providing security aware applications comprising:
at least one processor; and
at least one memory coupled to the at least one processor, the at least one memory having stored therein instructions which when executed by any set of the one or more processors, perform a process for providing security aware applications, the process for providing security aware applications including:

defining one or more operational parameters associated with assets used to implement an application, the defined one or more operational parameters at least including an expected communications traffic pattern associated with the application, and/or an asset used to implement the application;

obtaining baseline values for the one or more operational parameters associated with assets used to implement the application;

defining a trigger deviation value for each of the one or more operational parameters associated with assets used to implement the application;

defining one or more trigger events that when detected in an asset used to implement the application require at least one responsive action, the trigger events including the occurrence of a trigger deviation value for any of the one or more operational parameters associated with assets used to implement the application;

defining at least one responsive action to be associated with each of the one or more trigger events;

generating data representing instructions for monitoring and detecting the one or more trigger events in assets used to implement the application;

generating data representing instructions for implementing the at least one responsive action associated with each of the one or more trigger events;

providing at least part of the data representing instructions for monitoring and detecting the one or more trigger events to at least one asset used to implement the application;

using the at least part of the data representing instructions for monitoring and detecting the one or more trigger events to detect a trigger event involving the at least one asset; and using the data representing instructions for implementing the at least one responsive action associated with each of the one or more trigger events to automatically implement the at least one responsive action associated with the detected trigger event.

20. The system for providing security aware applications of claim 19 wherein at least one of the operational parameters for assets used to implement an application to be monitored is selected from the group operational parameters consisting of:
a deployment pattern associated with the application, and/or an asset used to implement the application;
a communications channel associated with the application, and/or an asset used to implement the application;
a communications channel configuration associated with the application, and/or an asset used to implement the application; and
a periodic event associated with the application, and/or an asset used to implement the application.

21. The system for providing security aware applications of claim 19 wherein at least one of the defined trigger events is selected from the group of trigger events consisting of:
a change in software associated with the application, and/or an asset used to implement the application;
a change in a software stack associated with the application, and/or an asset used to implement the application;
the receipt of one or more defined commands by the application, and/or an asset used to implement the application;

a change in a deployment pattern associated with the application, and/or an asset used to implement the application;

a change in a communications channel associated with the application, and/or an asset used to implement the application;

a change in a communications channel configuration associated with the application, and/or an asset used to implement the application;

a deviation from an expected communications traffic pattern associated with the application, and/or an asset used to implement the application;

a geo-location of the recipient of communications traffic associated with the application, and/or an asset used to implement the application;

a geo-location of the originator of communications traffic associated with the application, and/or an asset used to implement the application;

a change in a pattern of wireless communications associated with the application, and/or an asset used to implement the application;

a change in a phone number associated with communications associated with the application, and/or an asset used to implement the application;

a change in a user ID associated with a user of the application, and/or an asset used to implement the application;

a change in the profile of a user associated with the application, and/or an asset used to implement the application;

a change in a periodic event associated with the application, and/or an asset used to implement the application; and a deviation from any defined expected normal operations parameter associated with the application, and/or an asset used to implement the application.

22. The system for providing security aware applications of claim 19 wherein at least one of the defined responsive actions is selected from the group of responsive actions consisting of:

disabling one or more operations performed by the application, and/or an asset used to implement the application, until one or more required actions have taken place;

permanently disabling one or more operations performed by the application, and/or an asset used to implement the application;

disabling one or more communications channels associated with the application, and/or an asset used to implement the application, until one or more required actions have taken place;

permanently disabling one or more communications channels associated with the application, and/or an asset used to implement the application;

blocking a portion of communications traffic associated with the application, and/or an asset used to implement the application, until one or more required actions have taken place;

permanently blocking a portion of communications traffic associated with the application, and/or an asset used to implement the application;

disabling the application, and/or an asset used to implement the application, until one or more required actions have taken place;

permanently disabling the application, and/or an asset used to implement the application, until one or more required actions have taken place; and directing a transfer of data from the application, and/or an asset used to implement the application, to a location outside the application, and/or an asset used to implement the application, before disabling the application, and/or an asset used to implement the application.

23. The system for providing security aware applications of claim 19 wherein the at least one asset used to implement the application is a virtual asset selected from the group of the virtual assets consisting of:

a virtual machine;
a virtual server;
a database or data store;
an instance in a cloud environment;
a cloud environment access system;
part of a mobile device;
part of a remote sensor;
part of a server computing system; and
part of a desktop computing system.

24. The system for providing security aware applications of claim 19 wherein the data representing instructions for monitoring and detecting the one or more trigger events in an asset and the data representing instructions for implementing the at least one responsive action associated with each of the one or more trigger events is provided by providing a security policy library to the application, and/or one or more assets used to implement the application.

25. The system for providing security aware applications of claim 19 wherein the data representing instructions for monitoring and detecting the one or more trigger events in an asset and the data representing instructions for implementing the at least one responsive action associated with each of the one or more trigger events is provided through a virtual asset creation template used to instantiate at least one virtual asset used to implement the application.

26. The system for providing security aware applications of claim 19 wherein the data representing instructions for monitoring and detecting the one or more trigger events in an asset and the data representing instructions for implementing the at least one responsive action associated with each of the one or more trigger events is provided by the owner of the application.

27. The system for providing security aware applications of claim 19 wherein the data representing instructions for monitoring and detecting the one or more trigger events in an asset and the data representing instructions for implementing the at least one responsive action associated with each of the one or more trigger events is provided by a provider of at least part of a production environment in which the application is implemented.

28. The system for providing security aware applications of claim 19 wherein the data representing instructions for monitoring and detecting the one or more trigger events in an asset and the data representing instructions for implementing the at least one responsive action associated with each of the one or more trigger events is provided by a third party service provider.

29. A method for providing security aware applications comprising:

defining one or more operational parameters associated with assets used to implement an application wherein one of the one or more defined operational parameters includes an expected communications traffic pattern associated with the application, and/or an asset used to implement the application;

obtaining baseline values for the one or more operational parameters associated with assets used to implement the application;

defining a trigger deviation value for each of the one or more operational parameters associated with assets used to implement the application;

defining one or more trigger events that when detected in an asset used to implement the application require at least one responsive action, the trigger events including the occurrence of a trigger deviation value for any of the one or more operational parameters associated with assets used to implement the application;

defining at least one responsive action to be associated with each of the one or more trigger events;

generating data representing instructions for monitoring and detecting the one or more trigger events in assets used to implement the application;

generating data representing instructions for implementing the at least one responsive action associated with each of the one or more trigger events;

providing at least part of the data representing instructions for monitoring and detecting the one or more trigger events to at least one asset used to implement the application;

using the at least part of the data representing instructions for monitoring and detecting the one or more trigger events to detect a trigger event involving the at least one asset; and using the data representing instructions for implementing the at least one responsive action associated with each of the one or more trigger events to automatically implement the at least one responsive action associated with the detected trigger event.

30. The method for providing security aware applications of claim 29 wherein at least one of the operational parameters for an asset used to implement an application to be monitored is selected from the group operational parameters consisting of:

a deployment pattern associated with the application, and/or an asset used to implement the application;

a communications channel associated with the application, and/or an asset used to implement the application;

a communications channel configuration associated with the application, and/or an asset used to implement the application; and a periodic event associated with the application, and/or an asset used to implement the application.

31. The method for providing security aware applications of claim 29 wherein at least one of the defined trigger events is selected from the group of trigger events consisting of:

a change in software associated with the application, and/or an asset used to implement the application;

a change in a software stack associated with the application, and/or an asset used to implement the application;

the receipt of one or more defined commands by the application, and/or an asset used to implement the application;

a change in a deployment pattern associated with the application, and/or an asset used to implement the application;

a change in a communications channel associated with the application, and/or an asset used to implement the application;

a change in a communications channel configuration associated with the application, and/or an asset used to implement the application;

a deviation from an expected communications traffic pattern associated with the application, and/or an asset used to implement the application;

a geo-location of the recipient of communications traffic associated with the application, and/or an asset used to implement the application;

a geo-location of the originator of communications traffic associated with the application, and/or an asset used to implement the application;

a change in a pattern of wireless communications associated with the application, and/or an asset used to implement the application;

a change in a phone number associated with communications associated with the application, and/or an asset used to implement the application;

a change in a user ID associated with a user of the application, and/or an asset used to implement the application;

a change in the profile of a user associated with the application, and/or an asset used to implement the application;

a change in a periodic event associated with the application, and/or an asset used to implement the application; and a deviation from any defined expected normal operations parameter associated with the application, and/or an asset used to implement the application.

32. The method for providing security aware applications of claim 29 wherein at least one of the defined responsive actions is selected from the group of responsive actions consisting of:

disabling one or more operations performed by the application, and/or an asset used to implement the application, until one or more required actions have taken place;

permanently disabling one or more operations performed by the application, and/or an asset used to implement the application;

disabling one or more communications channels associated with the application, and/or an asset used to implement the application, until one or more required actions have taken place;

permanently disabling one or more communications channels associated with the application, and/or an asset used to implement the application;

blocking a portion of communications traffic associated with the application, and/or an asset used to implement the application, until one or more required actions have taken place;

permanently blocking a portion of communications traffic associated with the application, and/or an asset used to implement the application;

disabling the application, and/or an asset used to implement the application, until one or more required actions have taken place;

permanently disabling the application, and/or an asset used to implement the application, until one or more required actions have taken place; and directing a transfer of data from the application, and/or an asset used to implement the application, to a location outside the application, and/or an asset used to implement the application, before disabling the application, and/or an asset used to implement the application.

33. The method for providing security aware applications of claim 29 wherein the at least one asset used to implement the application is a virtual asset selected from the group of the virtual assets consisting of:

a virtual machine;

a virtual server;

a database or data store;

an instance in a cloud environment;

a cloud environment access system;
part of a mobile device;
part of a remote sensor;
part of a server computing system; and
part of a desktop computing system.

34. The method for providing security aware applications of claim 29 wherein the data representing instructions for monitoring and detecting the one or more trigger events in an asset and the data representing instructions for implementing the at least one responsive action associated with each of the one or more trigger events is provided by providing a security policy library to the application, and/or one or more assets used to implement the application.

35. The method for providing security aware applications of claim 29 wherein the data representing instructions for monitoring and detecting the one or more trigger events in an asset and the data representing instructions for implementing the at least one responsive action associated with each of the one or more trigger events is provided through a virtual asset creation template used to instantiate at least one virtual asset used to implement the application.

36. The method for providing security aware applications of claim 29 wherein the data representing instructions for monitoring and detecting the one or more trigger events in an asset and the data representing instructions for implementing the at least one responsive action associated with each of the one or more trigger events is provided by the owner of the application.

37. The method for providing security aware applications of claim 29 wherein the data representing instructions for monitoring and detecting the one or more trigger events in an asset and the data representing instructions for implementing the at least one responsive action associated with each of the one or more trigger events is provided by a provider of at least part of a production environment in which the application is implemented.

38. The method for providing security aware applications of claim 29 wherein the data representing instructions for monitoring and detecting the one or more trigger events in an asset and the data representing instructions for implementing the at least one responsive action associated with each of the one or more trigger events is provided by a third party service provider.

39. A system for providing security aware applications comprising:
at least one processor; and
at least one memory coupled to the at least one processor, the at least one memory having stored therein instructions which when executed by any set of the one or more processors, perform a process for providing security aware applications, the process for providing security aware applications including:
defining one or more trigger events that when detected in an asset used to implement an application require at least one responsive action;
defining at least one responsive action to be associated with each of the one or more trigger events, wherein one of the defined at least one responsive actions includes obtaining data from the application, and/or an asset used to implement the application, before disabling the application, and/or an asset used to implement the application;
generating data representing instructions for monitoring and detecting the one or more trigger events in an asset used to implement the application;
generating data representing instructions for implementing the at least one responsive action associated with each of the one or more trigger events;
providing at least part of the data representing instructions for monitoring and detecting the one or more trigger events in an asset to at least one asset used to implement the application;
using the at least part of the data representing instructions for monitoring and detecting the one or more trigger events in an asset to detect a trigger event involving the at least one asset; and
using the data representing instructions for implementing the at least one responsive action associated with each of the one or more trigger events to automatically implement the at least one responsive action associated with the detected trigger event.

40. A system for providing security aware applications comprising:
an application;
a production environment for implementing the application;
one or more assets used to implement the application in the production environment;
data for monitoring and detecting one or more trigger events in one of more of the assets used to implement the application in the production environment;
data representing instructions for implementing at least one responsive action associated with each of the one or more trigger events upon detection of the one or more trigger events in one of more of the assets used to implement the application in the production environment, wherein at least one responsive action associated with at least one trigger event includes obtaining data from the application, and/or an asset used to implement the application, before disabling the application, and/or an asset used to implement the application;
at least one processor; and
at least one memory coupled to the at least one processor, the at least one memory having stored therein instructions which when executed by any set of the one or more processors, perform a process for providing security aware applications, the process for providing security aware applications including:
providing at least part of the data for monitoring and detecting the one or more trigger events to at least one asset used to implement the application in the production environment;
using the at least part of the data for monitoring and detecting the one or more trigger events to detect a trigger event involving the at least one asset; and
using the data representing instructions for implementing the at least one responsive action associated with each of the one or more trigger events to automatically implement the at least one responsive action associated with the detected trigger event.

41. A system for providing security aware applications comprising:
at least one processor; and
at least one memory coupled to the at least one processor, the at least one memory having stored therein instructions which when executed by any set of the one or more processors, perform a process for providing security aware applications, the process for providing security aware applications including:
defining one or more operational parameters associated with assets used to implement an application, the defined one or more operational parameters at least including a pattern of wireless communications associated with the application, and/or an asset used to implement the application;

obtaining baseline values for the one or more operational parameters associated with assets used to implement the application;

defining a trigger deviation value for each of the one or more operational parameters associated with assets used to implement the application;

defining one or more trigger events that when detected in an asset used to implement the application require at least one responsive action, the trigger events including the occurrence of a trigger deviation value for any of the one or more operational parameters associated with assets used to implement the application;

defining at least one responsive action to be associated with each of the one or more trigger events;

generating data representing instructions for monitoring and detecting the one or more trigger events in assets used to implement the application;

generating data representing instructions for implementing the at least one responsive action associated with each of the one or more trigger events;

providing at least part of the data representing instructions for monitoring and detecting the one or more trigger events to at least one asset used to implement the application;

using the at least part of the data representing instructions for monitoring and detecting the one or more trigger events to detect a trigger event involving the at least one asset; and using the data representing instructions for implementing the at least one responsive action associated with each of the one or more trigger events to automatically implement the at least one responsive action associated with the detected trigger event.

42. A system for providing security aware applications comprising:

at least one processor; and at least one memory coupled to the at least one processor, the at least one memory having stored therein instructions which when executed by any set of the one or more processors, perform a process for providing security aware applications, the process for providing security aware applications including:

defining one or more operational parameters associated with assets used to implement an application;

obtaining baseline values for the one or more operational parameters associated with assets used to implement the application;

defining a trigger deviation value for each of the one or more operational parameters associated with assets used to implement the application;

defining one or more trigger events that when detected in an asset used to implement the application require at least one responsive action, the trigger events including the occurrence of a trigger deviation value for any of the one or more operational parameters associated with assets used to implement the application;

defining at least one responsive action to be associated with each of the one or more trigger events, wherein the defined at least one responsive actions includes notifying a party or entity of the detected trigger event;

generating data representing instructions for monitoring and detecting the one or more trigger events in assets used to implement the application;

generating data representing instructions for implementing the at least one responsive action associated with each of the one or more trigger events;

providing at least part of the data representing instructions for monitoring and detecting the one or more trigger events to at least one asset used to implement the application;

using the at least part of the data representing instructions for monitoring and detecting the one or more trigger events to detect a trigger event involving the at least one asset; and using the data representing instructions for implementing the at least one responsive action associated with each of the one or more trigger events to automatically implement the at least one responsive action associated with the detected trigger event.

43. A system for providing security aware applications comprising:

at least one processor; and at least one memory coupled to the at least one processor, the at least one memory having stored therein instructions which when executed by any set of the one or more processors, perform a process for providing security aware applications, the process for providing security aware applications including:

defining one or more operational parameters associated with assets used to implement an application;

obtaining baseline values for the one or more operational parameters associated with assets used to implement the application;

defining a trigger deviation value for each of the one or more operational parameters associated with assets used to implement the application;

defining one or more trigger events that when detected in an asset used to implement the application require at least one responsive action, the trigger events including the occurrence of a trigger deviation value for any of the one or more operational parameters associated with assets used to implement the application;

defining at least one responsive action to be associated with each of the one or more trigger events, wherein the defined at least one responsive actions includes obtaining data from the application, and/or an asset used to implement the application, before disabling the application, and/or an asset used to implement the application;

generating data representing instructions for monitoring and detecting the one or more trigger events in assets used to implement the application;

generating data representing instructions for implementing the at least one responsive action associated with each of the one or more trigger events;

providing at least part of the data representing instructions for monitoring and detecting the one or more trigger events to at least one asset used to implement the application;

using the at least part of the data representing instructions for monitoring and detecting the one or more trigger events to detect a trigger event involving the at least one asset; and using the data representing instructions for implementing the at least one responsive action associated with each of the one or more trigger events to automatically implement the at least one responsive action associated with the detected trigger event.

44. A method for providing security aware applications comprising:

defining one or more operational parameters associated with assets used to implement an application, wherein one of the one or more operational parameters includes a pattern of wireless communications associated with the application, and/or an asset used to implement the application;

obtaining baseline values for the one or more operational parameters associated with assets used to implement the application;

defining a trigger deviation value for each of the one or more operational parameters associated with assets used to implement the application;

defining one or more trigger events that when detected in an asset used to implement the application require at least one responsive action, the trigger events including the occurrence of a trigger deviation value for any of the one or more operational parameters associated with assets used to implement the application;

defining at least one responsive action to be associated with each of the one or more trigger events;

generating data representing instructions for monitoring and detecting the one or more trigger events in assets used to implement the application;

generating data representing instructions for implementing the at least one responsive action associated with each of the one or more trigger events;

providing at least part of the data representing instructions for monitoring and detecting the one or more trigger events to at least one asset used to implement the application;

using the at least part of the data representing instructions for monitoring and detecting the one or more trigger events to detect a trigger event involving the at least one asset; and using the data representing instructions for implementing the at least one responsive action associated with each of the one or more trigger events to automatically implement the at least one responsive action associated with the detected trigger event.

45. A method for providing security aware applications comprising:

defining one or more operational parameters associated with assets used to implement an application;

obtaining baseline values for the one or more operational parameters associated with assets used to implement the application;

defining a trigger deviation value for each of the one or more operational parameters associated with assets used to implement the application;

defining one or more trigger events that when detected in an asset used to implement the application require at least one responsive action, the trigger events including the occurrence of a trigger deviation value for any of the one or more operational parameters associated with assets used to implement the application;

defining at least one responsive action to be associated with each of the one or more trigger events wherein one of the defined at least one responsive actions includes notifying a party or entity of the detected trigger event;

generating data representing instructions for monitoring and detecting the one or more trigger events in assets used to implement the application;

generating data representing instructions for implementing the at least one responsive action associated with each of the one or more trigger events;

providing at least part of the data representing instructions for monitoring and detecting the one or more trigger events to at least one asset used to implement the application;

using the at least part of the data representing instructions for monitoring and detecting the one or more trigger events to detect a trigger event involving the at least one asset; and using the data representing instructions for implementing the at least one responsive action associated with each of the one or more trigger events to automatically implement the at least one responsive action associated with the detected trigger event.

46. A method for providing security aware applications comprising:

defining one or more operational parameters associated with assets used to implement an application;

obtaining baseline values for the one or more operational parameters associated with assets used to implement the application;

defining a trigger deviation value for each of the one or more operational parameters associated with assets used to implement the application;

defining one or more trigger events that when detected in an asset used to implement the application require at least one responsive action, the trigger events including the occurrence of a trigger deviation value for any of the one or more operational parameters associated with assets used to implement the application;

defining at least one responsive action to be associated with each of the one or more trigger events wherein one of the defined at least one defined responsive actions includes obtaining data from the application, and/or an asset used to implement the application, before disabling the application, and/or an asset used to implement the application;

generating data representing instructions for monitoring and detecting the one or more trigger events in assets used to implement the application;

generating data representing instructions for implementing the at least one responsive action associated with each of the one or more trigger events;

providing at least part of the data representing instructions for monitoring and detecting the one or more trigger events to at least one asset used to implement the application;

using the at least part of the data representing instructions for monitoring and detecting the one or more trigger events to detect a trigger event involving the at least one asset; and using the data representing instructions for implementing the at least one responsive action associated with each of the one or more trigger events to automatically implement the at least one responsive action associated with the detected trigger event.

\* \* \* \* \*